(12) United States Patent
MacIver

(10) Patent No.: US 7,331,857 B2
(45) Date of Patent: Feb. 19, 2008

(54) GAMING SYSTEM

(75) Inventor: Peter MacIver, Huntington Beach, CA (US)

(73) Assignee: Mattel, Inc., El Segundo, CA (US)

( * ) Notice: Subject to any disclaimer, the term of this patent is extended or adjusted under 35 U.S.C. 154(b) by 0 days.

(21) Appl. No.: 11/266,760

(22) Filed: Nov. 2, 2005

(65) Prior Publication Data

US 2006/0121965 A1 Jun. 8, 2006

Related U.S. Application Data

(63) Continuation-in-part of application No. 11/199,718, filed on Aug. 8, 2005.

(60) Provisional application No. 60/683,897, filed on May 23, 2005, provisional application No. 60/670,777, filed on Apr. 12, 2005, provisional application No. 60/668,829, filed on Apr. 5, 2005, provisional application No. 60/630,709, filed on Nov. 23, 2004, provisional application No. 60/625,473, filed on Nov. 3, 2004.

(51) Int. Cl.
*A63F 9/24* (2006.01)
(52) U.S. Cl. ............... 463/9; 463/23; 463/36; 463/40; 345/156
(58) Field of Classification Search ............ 463/9
See application file for complete search history.

(56) References Cited

U.S. PATENT DOCUMENTS 3,569,937 A 3/1971 Heatter (Continued)

FOREIGN PATENT DOCUMENTS

EP 1400267 3/2004

(Continued)

OTHER PUBLICATIONS

Sega CD gaming systems, Sega, Japan 1992.*
Jeopardy for Sega CD, Sony Imagesoft, 1994.*
Sony Playstation gaming system, Sony Electronics, Japan, 1995.*
Who wants to be a Millionaire, Disney Interactive, Nov. 1999.*

(Continued)

*Primary Examiner*—Robert Pezzuto
*Assistant Examiner*—Sunit Pandya
(74) *Attorney, Agent, or Firm*—Kolisch Hartwell, P.C.

(57) ABSTRACT

A gaming system for use with a media player and one or more output devices, where the media player is configured to receive user signals, to read and execute information from a game medium, and to present portions of the information on the one or more output devices. The gaming system includes a first remote unit configured to transmit signals corresponding to a first user and a second remote unit configured to transmit signals corresponding to a second user. The gaming system also includes a game medium having information readable by the media player that, when executed, causes the media player to produce a game having a plurality of scenes. Each scene causes the media player to selectively respond to the reception of user signals. A first scene causes the media player either: to respond to the reception of a first signal from the first remote unit by producing a second scene that causes the media player to disregard the reception of signals transmitted by the second remote unit; or to respond to the reception of a second signal from the second remote unit by producing a third scene that causes the media player to disregard the reception of signals transmitted by the first remote unit.

8 Claims, 10 Drawing Sheets

U.S. PATENT DOCUMENTS

| | | | |
|---|---|---|---|
| 3,949,986 A | 4/1976 | Breslow | |
| 4,124,214 A | 11/1978 | Pavis | |
| 4,359,223 A | 11/1982 | Baer et al. | |
| 4,372,554 A | 2/1983 | Orenstein | |
| 4,490,810 A | 12/1984 | Hon | |
| 4,575,770 A | 3/1986 | Dieterich | |
| 4,593,904 A * | 6/1986 | Graves | 463/9 |
| 4,623,887 A | 11/1986 | Welles, II | |
| 4,625,244 A | 11/1986 | Delzio | |
| 4,626,848 A | 12/1986 | Ehlers | |
| 4,771,283 A * | 9/1988 | Imoto | 340/825.71 |
| 4,855,842 A | 8/1989 | Hayes | |
| 4,856,081 A | 8/1989 | Smith | |
| 4,897,827 A | 1/1990 | Raetzer | |
| 4,927,147 A | 5/1990 | Delzio | |
| 4,948,126 A | 8/1990 | Drummond | |
| 4,959,734 A | 9/1990 | Foster | |
| 4,959,810 A | 9/1990 | Darbee et al. | |
| 5,034,807 A * | 7/1991 | Von Kohorn | 725/5 |
| 5,083,800 A * | 1/1992 | Lockton | 463/42 |
| 5,213,337 A | 5/1993 | Sherman | |
| 5,219,291 A | 6/1993 | Fong et al. | |
| 5,228,077 A | 7/1993 | Darbee | |
| 5,229,763 A | 7/1993 | Nakamaru | |
| 5,251,904 A | 10/1993 | Cruz | |
| 5,255,313 A | 10/1993 | Darbee | |
| 5,295,834 A | 3/1994 | Saunders | |
| 5,314,197 A | 5/1994 | Hersch | |
| 5,364,108 A * | 11/1994 | Esnouf | 463/9 |
| 5,401,032 A | 3/1995 | Barnhart et al. | |
| 5,429,363 A | 7/1995 | Hayashi | |
| 5,450,490 A | 9/1995 | Jensen et al. | |
| 5,605,505 A * | 2/1997 | Han | 463/39 |
| 5,607,356 A | 3/1997 | Schwartz | |
| 5,607,357 A * | 3/1997 | Kim et al. | 463/40 |
| 5,613,909 A | 3/1997 | Stelovsky | |
| 5,632,624 A * | 5/1997 | Cameron et al. | 434/322 |
| 5,679,075 A * | 10/1997 | Forrest et al. | 463/9 |
| 5,689,353 A | 11/1997 | Darbee et al. | |
| 5,691,710 A | 11/1997 | Pietraszak et al. | |
| 5,764,763 A | 6/1998 | Jensen et al. | |
| 5,782,692 A | 7/1998 | Stelovsky | |
| 5,788,507 A * | 8/1998 | Redford et al. | 434/307 R |
| 6,080,063 A * | 6/2000 | Khosla | 463/42 |
| 6,127,941 A * | 10/2000 | Van Ryzin | 340/825.69 |
| 6,144,367 A * | 11/2000 | Berstis | 345/158 |
| 6,213,880 B1 | 4/2001 | Sim | |
| 6,215,952 B1 | 4/2001 | Yoshio | |
| 6,223,348 B1 | 4/2001 | Hayes | |
| 6,229,952 B1 | 5/2001 | Nonomura | |
| 6,264,559 B1 | 7/2001 | Lawrence | |
| 6,267,379 B1 * | 7/2001 | Forrest et al. | 273/431 |
| 6,309,275 B1 | 10/2001 | Fong et al. | |
| 6,358,111 B1 | 3/2002 | Fong et al. | |
| 6,375,535 B1 | 4/2002 | Fong et al. | |
| 6,419,232 B1 | 7/2002 | Sturdevant, II | |
| 6,422,558 B1 | 7/2002 | Chambers | |
| 6,454,625 B1 | 9/2002 | Fong et al. | |
| 6,497,412 B1 | 12/2002 | Bramm | |
| 6,497,604 B2 | 12/2002 | Fong et al. | |
| 6,497,606 B2 | 12/2002 | Fong et al. | |
| 6,520,504 B2 | 2/2003 | Loder | |
| 6,524,188 B2 | 2/2003 | Wang | |
| 6,565,440 B2 | 5/2003 | Hames | |
| 6,565,441 B1 | 5/2003 | Hames | |
| 6,579,184 B1 * | 6/2003 | Tanskanen | 463/41 |
| 6,587,067 B2 | 7/2003 | Darbee et al. | |
| 6,641,454 B2 | 11/2003 | Fong et al. | |
| 6,657,550 B1 | 12/2003 | Flinn | |
| 6,692,358 B2 | 2/2004 | Lawrence et al. | |
| 6,773,349 B2 | 8/2004 | Hussaini et al. | |
| 6,800,031 B2 * | 10/2004 | Di Cesare | 463/40 |
| 6,826,370 B2 | 11/2004 | Escobosa et al. | |
| 6,863,606 B1 * | 3/2005 | Berg et al. | 463/16 |
| 6,951,516 B1 * | 10/2005 | Eguchi et al. | 463/40 |
| 6,987,925 B2 | 1/2006 | Kinzer | |
| 7,003,598 B2 * | 2/2006 | Kavanagh | 710/62 |
| 7,008,324 B1 * | 3/2006 | Johnson et al. | 463/42 |
| 7,115,032 B2 | 10/2006 | Cantu | |
| 2001/0008849 A1 | 7/2001 | Komata | |
| 2002/0034980 A1 | 3/2002 | Lemmons et al. | |
| 2002/0140855 A1 | 10/2002 | Hayes | |
| 2003/0027633 A1 | 2/2003 | Hames | |
| 2003/0190961 A1 | 10/2003 | Seidman | |
| 2003/0199292 A1 | 10/2003 | Greenberg | |
| 2003/0220142 A1 | 11/2003 | Siegel | |
| 2004/0001078 A1 | 1/2004 | Rosing et al. | |
| 2004/0014524 A1 | 1/2004 | Pearlman | |
| 2004/0023719 A1 | 2/2004 | Hussaini et al. | |
| 2004/0048642 A1 | 3/2004 | Kinzer et al. | |
| 2004/0054826 A1 | 3/2004 | Kavanagh | |
| 2004/0066377 A1 | 4/2004 | Ha | |
| 2004/0080111 A1 | 4/2004 | Adair, Jr. | |
| 2004/0125075 A1 | 7/2004 | Diercks | |
| 2004/0125080 A1 | 7/2004 | Ha et al. | |
| 2004/0132533 A1 | 7/2004 | Leifer | |
| 2004/0140997 A1 | 7/2004 | Gravina et al. | |
| 2004/0140998 A1 | 7/2004 | Gravina et al. | |
| 2004/0166915 A1 | 8/2004 | Robarge | |
| 2005/0014563 A1 | 1/2005 | Barri | |
| 2005/0026699 A1 | 2/2005 | Kinzer et al. | |
| 2005/0070361 A1 | 3/2005 | Lau | |
| 2005/0097437 A1 | 5/2005 | Green | |
| 2005/0113164 A1 | 5/2005 | Buecheler et al. | |
| 2005/0202871 A1 | 9/2005 | Lippincott | |
| 2005/0227764 A1 | 10/2005 | Cantu et al. | |
| 2005/0232577 A1 | 10/2005 | Green | |
| 2006/0089193 A1 | 4/2006 | Buecheler et al. | |

FOREIGN PATENT DOCUMENTS

| | | |
|---|---|---|
| EP | 1629870 | 3/2006 |
| GB | 2234446 | 2/1991 |
| GB | 2422466 | 7/2006 |
| WO | WO03/094519 | 11/2003 |
| WO | WO2004/007042 | 1/2004 |
| WO | WO2004/010389 | 1/2004 |
| WO | WO2004/081765 | 9/2004 |
| WO | WO2005/008428 | 1/2005 |
| WO | WO2006/075194 | 7/2006 |

OTHER PUBLICATIONS

"Outburst" (game instructions), © 1988, Hersch & Company, 4 pages.
"Taboo" (game instructions), © 1989, Milton Bradley, 2 pages.
"Celebrity Taboo" (game instructions), © 1991, Milton Bradley, 2 pages.
"Outburst Junior" (game instructions), © 1992, Hersch and Company, 3 pages.
"Taboo" (game instructions), © 1999, Hersch and Company, 2 pages.
"Taboo" (game instructions), © 2000, Hersch and Company, 2 pages.
"Outburst Jr!" (game instructions), © 2001, Hersch and Company, 3 pages.
"Electronic Outburst" (game instructions), © 2001, Hersch and Company, 6 pages.
"Outburst!" (game instructions), © 2002, Hersch and Company, 3 pages.
"Scent It?" (game instructions), © 2003, Mattel, Inc., 8 pages.
"Taboo For Kids" (game instructions), © 2004, Hersch and Company, 2 pages.
"Celebrity Taboo" (game instructions), © 2004, Hersch and Company, 2 pages.

"Outburst Remix!" (game instructions); © 2004, Hersch and Co., 2 pages.
"Outburst Jr!", (game instructions), © 2004, Hersch and Co., 1 page.
Scene It? Jr., (game instructions), © 2004, Mattel Inc., 3 pages.

"Scene It?" (game instructions), © 2005, Mattel Inc., 2 pages.
"Anyone can be a Millionaire on DVD this Christmas", Nov. 2002, Zoo Digital Group plc, 3 pages.

* cited by examiner

GAMING SYSTEM

CROSS-REFERENCE TO RELATED APPLICATIONS

This is a continuation-in-part of U.S. patent application Ser. No. 11/199,718 entitled "Interactive DVD Gaming Systems," filed Aug. 8, 2005. This application also claims, under 35 U.S.C. § 119(e), the benefit of U.S. Provisional Patent Application Ser. No. 60/625,473 entitled "Interactive DVD Gaming System," filed Nov. 3, 2004; U.S. Provisional Patent Application Ser. No. 60/630,709 entitled "New Format Learning Platform," filed Nov. 23, 2004; U.S. Provisional Patent Application Ser. No. 60/668,829 entitled "Interactive DVD Gaming System," filed Apr. 5, 2005; U.S. Provisional Patent Application Ser. No. 60/670,777 entitled "Interactive DVD Gaming Systems," filed Apr. 12, 2005; and U.S. Provisional Patent Application Ser. No. 60/683,897 entitled "DVD Duo Tone LCD Text Device DVD Gaming System Remote Game Device," filed May 23, 2005. The complete disclosures of the above applications are herein incorporated by reference for all purposes.

BACKGROUND

A popular format of games is the "video game," in which a player interacts with a system having a video display. While video games are popular, they can be expensive. Arcades and other commercial establishments provide such games on a pay-to-play basis, so that a user must continually pay to play the game. Home gaming consoles are manufactured and sold to consumers who wish to enjoy unlimited usage of compatible video games at home. However, such consoles and their compatible games are typically quite expensive. Therefore, many consumers are attracted to games that may be played on their existing home media players without the need for a separate gaming console that may only be used with compatible games.

Some commercially available gaming systems may be used in conjunction with a consumer's home media player, such as a digital video disc ("DVD") player, to create a home entertainment system. Examples of gaming systems are found in: EP 1,400,267; WO 2004/010389; WO 2004/081765; U.S. Patent Application Nos. 2004/0048642; 2004/0054826; 2004/0140997; and 2004/0140998; and U.S. Pat. No. 5,219,291 the disclosures of which are hereby incorporated by reference in their entirety for all purposes.

DETAILED DESCRIPTION

Figure 1:
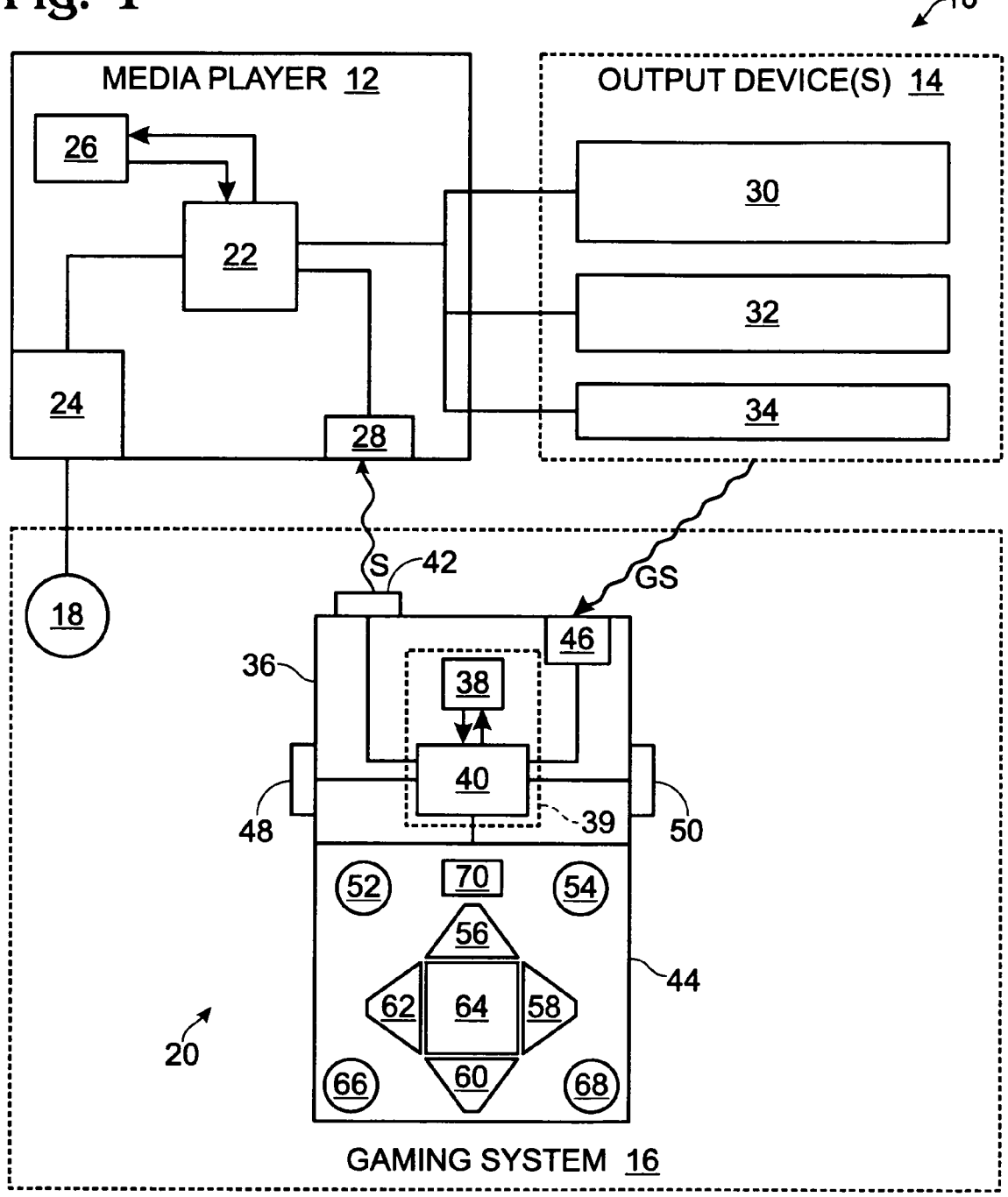
FIG. 1 shows a block diagram of an entertainment system, including a media player, a game display, and a gaming system.

FIG. 1 shows a block diagram of an entertainment system 10. The entertainment system may include: a media player 12; one or more output devices 14; and a gaming system 16, including a game medium 18 and one or more remote units 20 (also referred to as "remote controls"). The media player may include any device for reading and executing (i.e. processing) information from the game medium, receiving and responding to user signals from the one or more remote units, and transmitting portions of the information to the one or more output devices. Each of the one or more output devices may include any device for receiving information transmitted by the media player, and presenting video, audio and/or other types of perceivable/detectable signals that correspond to the received information. The game medium may include any device for storing information that causes the media player to produce a game when read and/or executed (i.e. processed) by the media player. Each of the one or more remote units may include any device that enables a user to transmit user signals to the media player. The particular embodiments of the entertainment system described below should not be considered as limiting, but rather as providing illustrative examples of the numerous possible configurations and features of the entertainment system.

A. The Media Player

The media player may include any device for reading and executing information from the game medium, receiving and responding to user signals from the one or more remote units, and transmitting portions of the information to the one or more output devices. Specifically, the media player 12 may include a processor 22, a reader 24, a memory 26, and a receiver 28. The processor may be configured to execute information read by the reader, transmit information to (i.e. present information on) the game display, access and/or modify values stored in the memory, and process signals received by the receiver. The reader (e.g. an optical reader, such as a laser, or some other form of data reader) may be configured to read data stored on a game medium 18. The memory may include random access memory ("RAM"), and may be configured to store game variables. The receiver may be configured to receive signals transmitted by one or more remote units 20, such as infrared signals ("IR signals"), radio-frequency signals ("RF signals") or any other type of suitable wireless or wired signal.

The media player 12 may be configured with varying amounts of RAM. For example, the media player may include a typical gaming console, such as a pay-to-play arcade gaming device, a personal computer, or a home gaming console, or a hand-held gaming device. Typical gaming consoles generally include sufficient RAM for storing the large amounts of game information required to play most video games. The media player may also include a conventional DVD player, which, in contrast to typical gaming consoles, is not specifically configured to play video games that require large amounts of RAM. Rather, conventional DVD players are configured with the minimum amount of resources needed to play encoded audio and video content that does not require large amounts of RAM. Conventional DVD players therefore generally include a minimal amount of RAM that enables the DVD player to use the menuing features encoded on some DVDs, to play one of several possible audio tracks, and to display one of several possible subtitles, etc. Most conventional DVD players, as the term is used in this disclosure, generally include less than about 1 kilobyte (1,024 bytes, or 8,192 bits) of onboard memory. Accordingly, some embodiments of the entertainment system may include media that uses the minimal amount of a conventional DVD player's onboard RAM memory to store game variables (e.g. information related to the progress of a game), which in turn may be used to control game flow.

B. The Output Device(s)

Each of the one or more output devices 14 may include any device that receives information transmitted by the media player 12, and presents video, audio and/or other types of perceivable/detectable signals corresponding to the received information. The one or more output devices may include a display screen 30, an audio system 32, and/or an auxiliary device 34. Each of the one or more output devices may be coupled to the media player in any manner known in the art. The display screen may include a cathode ray tube ("CRT"), plasma, liquid crystal display ("LCD") or light emitting diode ("LED") screens, or any other suitable display screens for presenting video signals. The audio system may include the built-in speakers of the display screen, a stand-alone audio system having an amplifier/receiver and speakers, and/or any other suitable audio system for presenting audio signals. The auxiliary device may include any device for generating signals detectable by some type of receiver, such as IR or other light signals, RF or other audio signals, etc.

The one or more output devices 14 may function as a signal generator operably attached to the media player 12. Specifically, one or more of the display screen 30, audio system 32, and/or auxiliary device 34 may be used by the media player 12 to generate and transmit signals, hereinafter referred to as generated signals GS, to one or more remote units 20. As discussed below, some remote units 20 may include a receiver 46 for receiving generated signals GS. These remote controls may, in turn, be configured to respond to the reception of generated signals GS, where a specific signal may cause a specific response. Consequently, the media player may be configured during game play to periodically transmit generated signals GS via one or more output devices. The generated signals may correspond to information stored on the game medium 18, or to information stored in the memory 26 of the media player.

C. The Gaming System

1. The Game Medium

The game medium 18 may include any device for storing information readable and/or executable by the media player. The game medium may include floppy discs, cartridges, SmartCards, compact discs ("CDs"), digital video discs ("DVDs"), or any other suitable data storage device containing data readable by the media player. The information stored on the game medium, when read and executed by the media player, may cause the media player to produce a game, and to selectively respond to user signals transmitted by a remote unit 20 and received by the media player 12.

Figure 2:
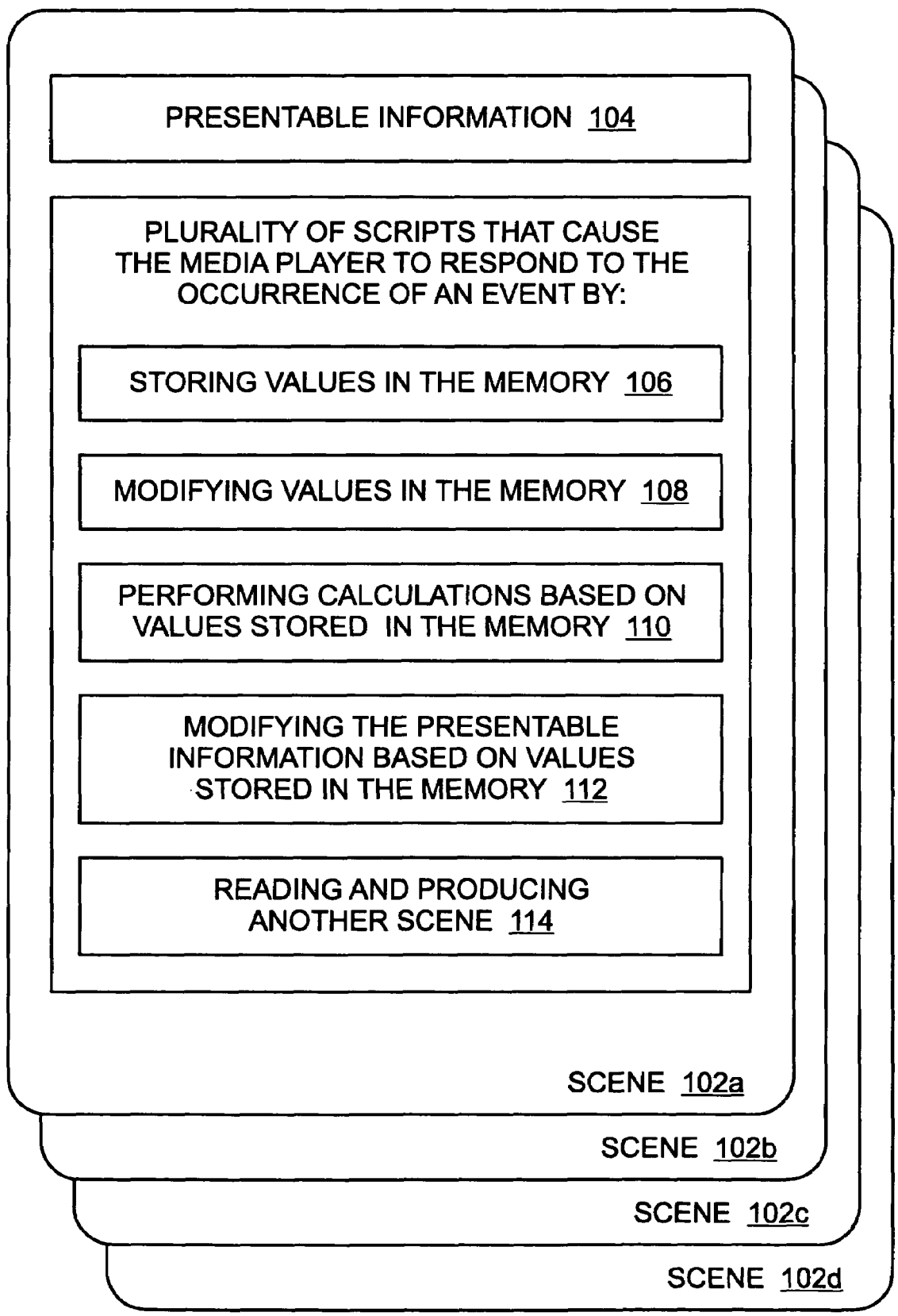
FIG. 2 shows a block diagram of an embodiment of game information stored on a game medium of the gaming system shown in FIG. 1.

FIG. 2 generally shows aspects of game information 100 stored on game medium 18. The game information may include a plurality of scenes, such as scenes 102a-d. While only four scenes are shown in FIG. 2, the game information may include any number of scenes. Each scene may include presentable information 104, corresponding to audio, video, and/or other types of perceivable/detectable signals. When a scene is produced by the media player 12, the scene's presentable information may be read by the reader 24, processed and transmitted by the processor 22, and presented with at least one of the one or more output devices 14. Each scene may also include one or more sets of instructions, hereinafter referred to as "scripts," that correspond to the scene's presentable information, and that are executed by the processor 22 when read by the reader 24. When a scene is produced, the scene's scripts may cause the media player to selectively respond to the occurrence of specific events, such as the reception of a user signal transmitted by a remote unit and received by the media player, the passage of a predetermined amount of time, the achievement of a pre-programmed game objective, etc. For example, scripts may cause the media player to respond to the occurrence of an event, such as by: storing values in the memory of the media player 106; modifying values stored in the memory of the media player 108; performing calculations based on values stored in the media player's memory 110; modifying the presentable information based on values stored in the memory of the media player 112; and/or reading and producing another scene 114.

The scenes may be used to control and/or record the progress of a game. Initially, production of a scene may cause the media player to read and transmit the presentable information associated with that scene to the output device(s). As indicated above, the presentable information may in part be modified based on one or more values stored in the memory of the media player, such as by including additional presentable information corresponding to the progress of the game, to variable interactive elements, etc. Scripts associated with the scene may cause the media player to dynamically respond to the occurrence of one or more events. For example, a first scene's scripts may cause the media player to produce a second scene upon the reception of signal A, a third scene upon the reception of signal B, a fourth scene upon the passage of a predetermined amount of time, and/or a fifth scene upon the achievement of a game objective. As yet another example, a scene may include scripts that cause the media player to use values stored in its memory to perform a first set of calculations upon the reception of signal A, or a second set of calculations upon the reception of signal B, whereby the results of those calculations may be used to modify values stored in the media player's memory. Finally, some scenes may include scripts that cause the media player to periodically use the game display 14 to transmit generated signals GS, as discussed above. The particular generated signal GS transmitted by the game display may depend in part on game variables stored in the media player's memory, and may include information related to the progress of the game (e.g. the current score, the current game round, etc.). These examples are intended to be illustrative, and in no way constrain the possible combinations of scripts that any particular scene may include.

Figure 3:
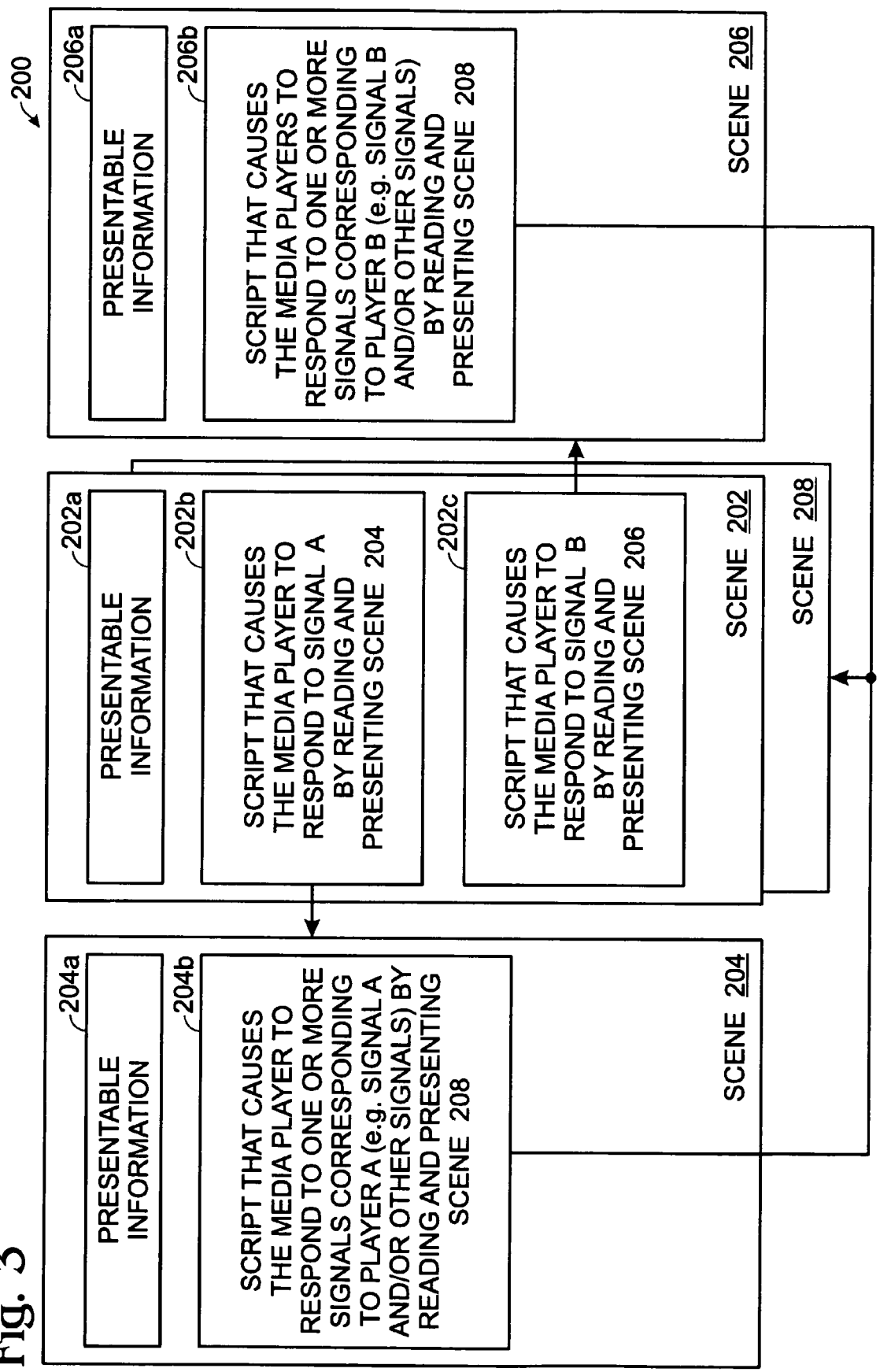
FIG. 3 shows a block diagram of an embodiment of the game information shown in FIG. 2.

Some scenes may specifically cause the media player to disregard the reception of certain user signals. As discussed below, some user signals may be associated with a specific player or team (i.e. signal A may be associated with player A, while signal B may be associated with player B). Also as discussed below, some gaming systems may "lock out" one or more players for predetermined portions of game play (i.e. locked out players may be unable to interact with a game for a predetermined amount of time). One way of accomplishing this is to provide a game medium 18 with: (a) some scenes having scripts that cause the media player to respond to the reception of certain user signals associated with all of the players; and (b) other scenes having scripts that cause the media player to respond to the reception of user signals associated with one player, but lacking scripts that cause the media player to respond to the reception of user signals associated with the other players (i.e. scenes that cause the media player to disregard the reception of user signals associated with the other players). This concept is illustrated in FIG. 3, which shows game information 200 including scenes 202, 204, 206, and 208.

Some scenes may cause the media player to respond to the reception of user signals associated with all of the players. For example, scene 202 shown in FIG. 3 may at least include presentable information 202*a*, and scripts 202*b* and 202*c*. The presentable information 202*a* may be read by the media player and presented on the output device(s), whereby players A and B may both be prompted to actuate buttons on one or more remote units 20 to interact with the game. Script 202*b* may cause the media player to respond to the reception of a signal A (associated with a player A), such as by producing scene 204. Likewise, script 202*c* may cause the media player to respond to the reception of a signal B (associated with a player B), such as by producing scene 206.

Scene 204 may cause the media player to respond to the reception of user signals associated with player A, but to disregard the reception of remote control signals associated with player B. For example, scene 204 may include presentable information 204*a* and script 204*b*. The presentable information 204*a* may be read by the media player and presented on the output device(s), whereby player A alone may be prompted to interact with the scene. Script 204*b* may cause the media player to respond to the reception of one or more user signals associated with player A (e.g. signal A and/or other signals), such as by producing scene 208. Scene 204 may, however, lack scripts that cause the media player to respond to one or more, or even all, of the user signals associated with player B (e.g. signal B and/or other signals). Scene 204 may therefore specifically cause the media player to disregard the reception of one or more of the user signals associated with player B, and player B may be partially or completely "locked out" of game play for at least the duration of the scene.

Scene 206 may cause the media player to respond to the reception of user signals associated with player B, but to disregard the reception of user signals associated with player A. For example, scene 206 may include presentable information 206*a* and script 206*b*. The presentable information 206*a* may be read by the media player and presented on the output device(s), whereby player B alone may be prompted to interact with the scene. Script 206*b* may cause the media player to respond to the reception of one or more user signals associated with player B (e.g. signal B and/or other signals), such as by producing scene 208. Scene 206 may, however, lack scripts that cause the media player to respond to one or more, or even all, of the user signals associated with player A (e.g. signal A and/or other signals). Scene 206 may therefore specifically cause the media player to disregard the reception of one or more of the user signals associated with player A, and player A may be partially or completely "locked out" of game play for at least the duration of the scene.

Scene 208 may be substantially similar to scene 202, in that it may cause the media player to respond to the reception of user signals associated with all of the players.

2. The Remote Unit(s)

As indicated above, the gaming system 16 may include one or more remote units 20, each of which may include any device that enables one or more users to interact with the game produced by the media player 12 upon reading and executing the information stored on the game medium 18. As shown in FIG. 1, each remote unit may include a housing 36, a controller 39, a transmitter 42, a control pad 44 having one or more buttons (i.e. inputs), a receiver 46, and/or one or more display devices 48 and 50.

The controller 39 may include a memory 38 and a processor 40. The memory may store information that is readable by the processor 40, and that configures the processor to respond to inputs by providing pre-programmed outputs. Specifically, upon receiving an input, the processor may access the information stored in the memory to determine how to respond. The information stored in the memory and/or the memory itself may be variable so as to change the manner in which the processor, and therefore the controller, is configured. The memory may include RAM and/or read-only memory ("ROM"). Some memory may be fixedly attached to the processor, while some memory may be removable and/or insertable (e.g. floppy discs, cartridges, SmartCards, CDs, DVDs, etc.). The processor may save/modify information in the memory, such as by downloading/inputting data into the memory from a source external to the remote control(s) 20. For example, one or more signals, such as a generated signal GS, may be received by the receiver 46, processed by the processor 40, and saved into the memory 38 by the processor. The information saved into the memory may, in turn, reconfigure the processor, and thus the controller. Some of the information saved in the memory may also be displayed by the controller on the one or more display devices 48 and 50.

The controller 39 may cause the transmitter 42 to transmit different signals upon actuation of different buttons on the control pad 44. Each button may thereby be "programmed" to cause the transmitter to transmit a specific wireless signal. For example, if the media player is a conventional DVD player, each button may be programmed to cause the transmitter to transmit a specific signal receivable by a conventional DVD player, such as "Up," "Down," "Left," "Right," "Enter," "Menu," "Fast Forward," "Rewind," and/or various number signals, etc.

The controller 39 may be configured to selectively operate in one or more modes. In some modes, each button on the control pad 44 may be programmed by the controller to cause the transmission of a specific signal. In other modes, each button may be programmed by the controller to cause the transmission of a different specific signal. Changing the controller's mode may thereby reprogram a particular button by changing the signal transmitted by the transmitter upon actuation of that button. For example, the controller may be configured to selectively operate in: a first mode that causes the transmitter to transmit a first signal upon actuation of a button; a second mode that causes the transmitter to transmit a second signal upon actuation of the button; a third mode that causes the transmitter not to transmit a signal upon actuation of the button, etc.

The controller 39 may be configured to change modes upon the occurrence of an event. More than one event may cause a controller operating in a particular mode to change to another mode, such as the actuation of one or more of the buttons on the control pad 44, the passage of time, the reception of a signal (e.g. generated signals GS) by the receiver 46, etc. Controllers operating in some modes may be configured to change modes upon the occurrence of some events, while controllers functioning in other modes may be configured to change modes upon the occurrence of other events. For example, the controller may be configured to change: from a first mode to a second mode upon the actuation of a first button; and from the second mode back to the first mode upon actuation of a second button or upon the reception of a generated signal GS.

The controller 39 may be configured to cause the transmitter 42 to transmit signals, and/or change modes, in manners that coordinate with the game being produced by the media player 12 upon reading and executing the information stored on the game medium 18. Specifically, the game medium may contain information that appropriately causes the media player 12 to respond to user signals transmitted by the gaming system's remote unit(s). The remote unit(s) may be game specific, whereby only a single game medium stores information that appropriately causes the media player to respond to the remote unit(s)' user signals. Alternatively, the remote unit(s) may be usable with a plurality of game media, whereby each game medium stores information that appropriately causes the media player to respond to the remote unit(s)' user signals. The data stored in the remote unit(s)' memory may be variable (such as by providing specific removable memory that stores data corresponding to game information stored on specific game medium), so as to enable a user to reconfigure the remote unit(s) for use with a plurality of game media.

The controller 39 of some remote unit(s) 20 may be configured to change modes in a manner that "locks out" one or more players for predetermined portions of a game. As discussed above, the controller may be configured to change modes upon the occurrence of an event (such as the actuation of a button, the passage of a predetermined amount of time, or the reception of a signal, etc.). Also as discussed above, the controller may be configured to change modes in manners that are consistent with the game produced by the media player 12 upon reading and executing the information stored on the game medium 18. At some point during a game, an event may occur that causes the controller to change modes in a manner that reprograms some or all of the buttons on the remote unit(s), so that the transmitter transmits signals upon the actuation of buttons associated with some players, and transmits no signals upon the actuation of buttons associated with other players. The other players may thereby be "locked out" of game play for a predetermined amount of time, such as until the controller changes modes at least one more time. During a subsequent portion of game play, an event may occur that causes the controller to change modes in a manner that reprograms some or all of the buttons on the remote unit(s), so that the transmitter transmits signals upon the actuation of buttons associated with all of the players. The buttons may thereby be reprogrammed such that none of the players are "locked out" of game play.

For example, the remote unit may include a button A associated with a player A, and a button B associated with a player B. The remote unit's controller may be configured to selectively operate in: a first mode that causes the transmitter to transmit a signal A upon actuation of button A, and a signal B upon actuation of button B; and a second mode that causes the transmitter to transmit signal A upon actuation of button A but does not cause the transmitter to transmit any signal upon actuation of the button B. The controller may also be configured to change from the first mode to the second mode upon the occurrence of an event (e.g. the actuation of button A or some other button, the reception of a signal by the receiver 46, etc.), where the event is coordinated with a predetermined portion of the game (e.g. the production of a scene having presentable information that prompts player A to cause the event that in turn causes the mode change). The controller may be configured to change from the second mode back to the first mode upon the occurrence of another event (e.g. the actuation of a reset or other button, the reception of a generated signal GS by the receiver 46, etc.).

Each remote unit 20 may be a remote control for use with a particular type of media player. For example, each remote unit may be a wireless remote control for use with a DVD player. Each remote control may be a universal remote control, having a controller 39 that is reconfigurable for use with one of a plurality of media players. For example, the memory 38 may store data that configures the controller 39 to function in a plurality of selectable modes. Selection of a particular mode, such as by entering a code associated with a particular type of media player, may reconfigure the controller to cause the transmitter to transmit signals that are receivable by that particular type of media player upon actuation of the buttons. Alternatively or additionally, each button on the universal remote control(s) may be individually programmable so as to cause the transmitter to transmit signals receivable by a particular type of media player. For example, each button may be individually programmed by: (1) selecting a programming mode; (2) selecting a button to program; (3) receiving at the receiver 46 a wireless signal transmitted by another remote control (such as the remote control associated with a particular type of media player); and (4) storing the received signal in the controller's memory. The controller may thereafter be configured to cause the transmitter to transmit the received signal upon actuation of the selected button. As another example, the memory of the universal remote control(s) may include data that permits a user to program each button individually by: (1) selecting a programming mode; (2) selecting a button to program, whereby the controller automatically causes the transmitter to transmit a series of different signals until a signal corresponding to a particular media player is identified; and (3) storing the identified signal in the memory. The controller may thereafter be configured to cause the transmitter to transmit the identified signal upon actuation of the selected button.

The controller 39 may be configured to cause the one or more display devices 48 and 50 to display information stored in the memory 38. As indicated above, the controller's processor 40 may save/modify data in the controller's memory 38, such as data received by the receiver 46. Some data may configure the controller to display information on the display devices. This information may be related to the progress of the game, as discussed in more detail below.

The transmitter 42 may include any device operably coupled to the controller for transmitting signals. The transmitter may include a light emitting diode ("LED") for transmitting one or more IR signals S, but may also include any other type of suitable transmitter.

Each of the buttons (i.e. inputs) on the control pad 44 may correspond to a specific game action. As discussed above, each button may be "programmed" to cause the transmitter 42 to transmit a specific wireless signal, such as "Up," "Down," "Left," "Right," "Enter," "Menu," etc. Also as discussed above, the game medium 18 may include information readable by the media player 12 that, when executed, causes the media player to produce a game having a plurality of scenes, where each scene may include one or more scripts that cause the media player to respond in a specific manner to the reception of a specific signal. The remote unit(s)' buttons may therefore be programmed in a manner that corresponds to specific game actions based on how a particular scene's scripts configure the media player to respond. As discussed below, different buttons may correspond to the same game actions performed by different players. Different buttons may correspond: (1) to the same game actions performed by different players; (2) to different game actions performed by different players; or (3) to different game actions performed by the same player.

Different buttons may correspond to the same game actions performed by different players. For example, a first button may be programmed to cause the transmitter to transmit an "Enter" signal corresponding to a "player A game action A" signal. A second button may be programmed to cause the transmitter to transmit a "Menu" signal, corresponding to a "player B game action A" signal. Some information stored on the game medium, when executed, may cause the media player to produce an interactive scene. The interactive scene may cause the media player to respond to the reception of the "Enter" signal in a manner corresponding to "player A" performing "game action A," or to respond to the reception of the "Menu" signal in a manner corresponding to "player B" performing "game action A". Each of these buttons may therefore correspond to the same game action performed by a different player.

Different buttons may correspond to different game actions performed by different players. For example, a first button may be programmed to cause the transmitter to transmit an "Enter" signal corresponding to a "player A game action A" signal. A second button may be programmed to cause the transmitter to transmit a "Menu" signal, corresponding to a "player B game action B" signal. Some information stored on the game medium, when executed, may cause the media player to produce an interactive scene. The interactive scene may cause the media player to respond to the reception of the "Enter" signal in a manner corresponding to "player A" performing "game action A," or to respond to the reception of the "Menu" signal in a manner corresponding to "player B" performing "game action B". Each of these buttons may therefore correspond to a different game action performed by a different player.

Different buttons may correspond to different game actions performed by the same player. For example, a first button may be programmed to cause the transmitter to transmit an "Enter" signal corresponding to a "player A game action A" signal. A second button may be programmed to cause the transmitter to transmit a "Menu" signal, corresponding to a "player A game action B" signal. Some information stored on the game medium, when executed, may cause the media player to produce an interactive scene. The interactive scene may cause the media player to respond to the reception of the "Enter" signal in a manner corresponding to "player A" performing "game action A," or to respond to the reception of the "Menu" signal in a manner corresponding to "player A" performing "game action B". Each of these buttons may therefore correspond to a different game action performed by the same player.

FIG. 1 illustrates some of the buttons that may be provided on the control pad 44 of a remote unit 20. As indicated above, each of these buttons may correspond to a specific game action. Specifically, each control pad 44 may include: a first "buzz in" button 52 associated with a first player or team; a second "buzz in" button 54 associated with a second player or team; an up button 56; a right button 58; a down button 60; a left button 62; a menu or enter button 64; a yes/true button 66; a no/false button 68; and/or a reset button 70. In the context of a game, "buzz in" buttons 52 and 54 may be used by a player to indicate that they would like to select an item presented on the display screen, or that they know the solution to a puzzle presented by the game display 14. The navigation buttons (i.e. the up, right, down, left and/or enter buttons) may be used by a player to change a point of view, or to move a cursor, selector and/or other object around the display screen 30. The Boolean buttons (i.e. the yes/true and no/false buttons) may be used by a player to provide an answer to a yes/no or true/false question presented by the game display. The reset button may be used by a player: to transmit a signal that resets aspects of the game; to reset some aspect of the remote control itself; and/or to change the mode of the remote unit's controller (e.g., the controller 39 may be configured to change to a base mode form a non-base mode upon actuation of the reset button). These buttons are merely illustrative. More or fewer buttons may be included that correspond to other common game actions. Further, the buttons discussed above may include any type of button, switch, input, dial, or equivalent structure for receiving user input.

The receiver 46 may include any device operably coupled to the controller 39 for receiving signals from a source external to the remote unit 20. The receiver may be configured to receive IR or other light signals, RF or other audio signals, or any other suitable signal transmittable from an external source. For example, the receiver may include a microphone for detecting audible signals produced by the speakers of audio system 32. The receiver may be operably attached to the remote unit's controller 39. As indicated above, the controller may be configured to respond to the occurrence of an event, such as the reception of a particular signal at the receiver. This response may include saving/modifying information in the controller's memory 38, changing modes, etc. For example, the remote unit may be a universal remote control, where the controller 39 is configured to respond to another remote control's signal by storing information in the memory. This information may in turn reconfigure the remote control to be a universal remote control. The controller 39 may also be configured to store information contained in one or more feedback signals ("GS") received by the receiver.

The display devices 48 and 50 may include any device operably coupled to the controller 39 for displaying information stored in the controller's memory 38. The display devices may include CRTs, LCDs, LEDs, and/or any other type of suitable device for visually displaying information. The display devices may be analog or digital. Some display devices may be configured to display information that corresponds to a specific player or team. Some display devices may display information related to the progress of the game (e.g. the current score, round, number of players, etc.).

Figure 4:
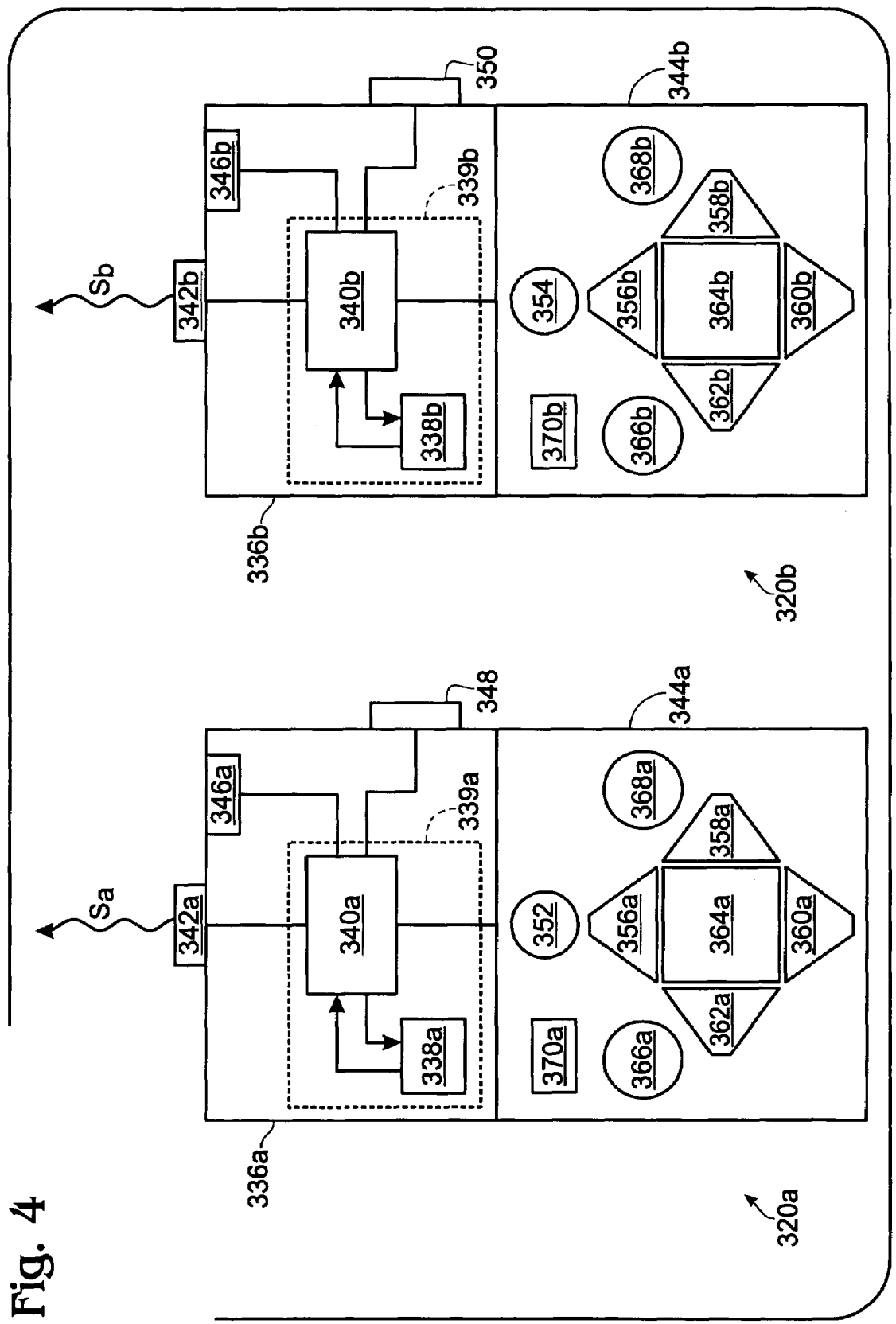
FIG. 4 shows a block diagram of an embodiment of the remote unit of the gaming system shown in FIG. 1.

FIG. 4 shows an embodiment of remote unit(s) 20, including a first remote unit 320a associated with a first player, and a second remote unit 320b associated with a second player. More or fewer remote units may be provided. As discussed above, each remote unit may include: a housing 336a,b; a controller 339a,b with a memory 338a,b and a processor 340a,b; a transmitter 342a,b for transmitting a signal Sa,b; a control pad 344a,b having a plurality of buttons; a receiver 346a,b, and/or a display device 348 and

350. Each of these structures may be configured in substantially the same manner as generally indicated above, and as further described below.

The remote units shown in FIG. 4 may include buttons corresponding to specific game actions. The first remote unit 320*a* may include: a first "buzz in" button 352 for transmitting a "buzz in" signal associated with the first player; one or more navigational buttons 356*a*-364*a*; Boolean buttons 366*a* and 368*a*; and/or a reset button 370*a*. The second remote unit 320*b* may include: a second "buzz in" button 354 for transmitting a "buzz in" signal associated with the second player; one or more navigational buttons 356*b*-364*b*; Boolean buttons 366*b* and 368*b*; and/or a reset button 370*b*. The "buzz in" buttons may each be programmed to cause their respective transmitters to produce a different user signal so as to enable the game to determine which player transmitted the signal. Each navigation button, Boolean button and/or reset button may be programmed to cause their respective transmitters to produce the same user signals as its counterpart on the opposite remote unit.

Figure 5:
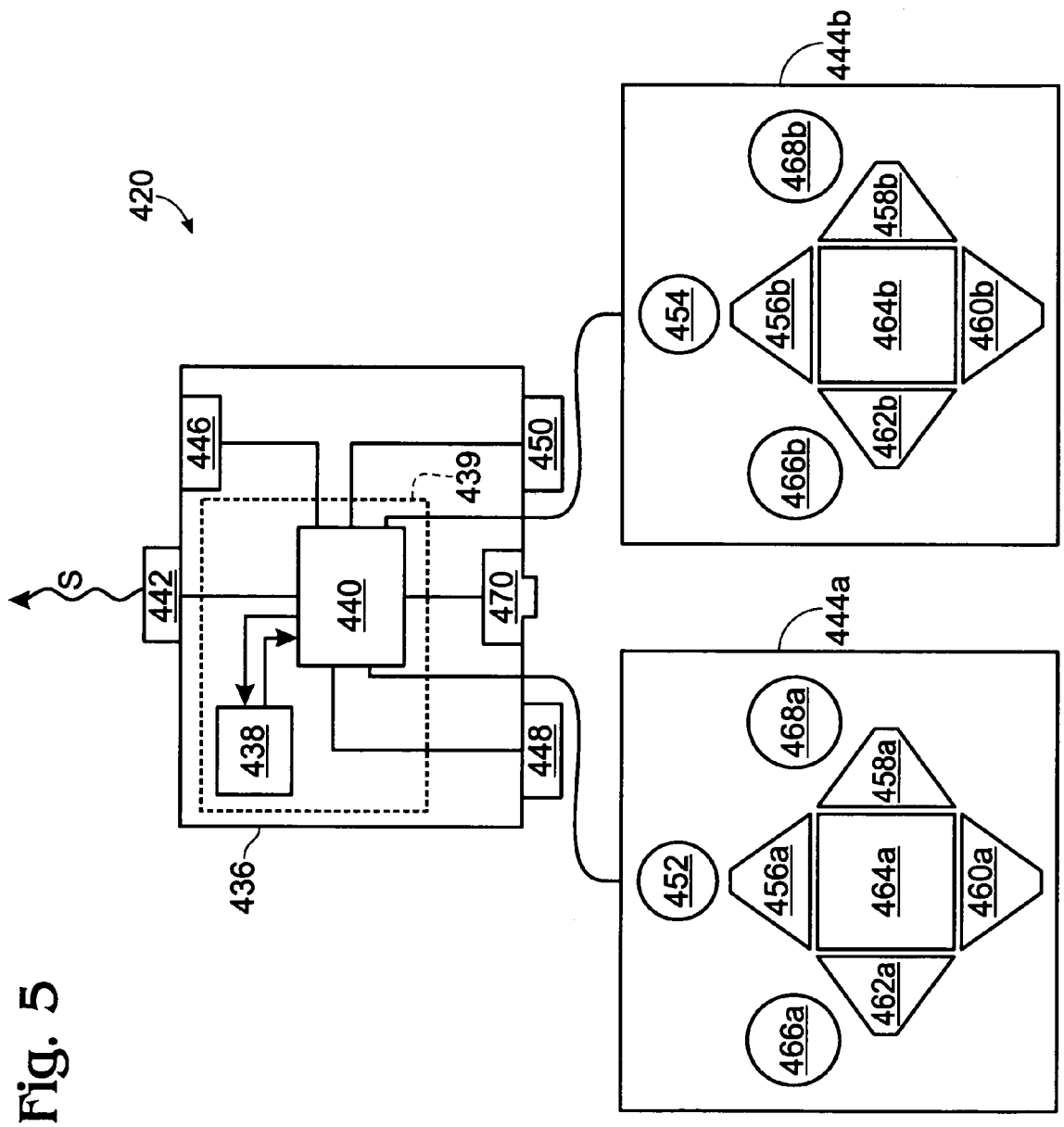
FIG. 5 shows a block diagram of another embodiment of the remote unit of the gaming system shown in FIG. 1.

FIG. 5 shows an embodiment 420 of the remote unit 20. The remote unit 420 may include a base unit 436 including: a controller 439 having a memory 438 and a processor 440; a transmitter 442 for transmitting a signal S; a receiver 446; one or more display devices 448 and 450; and/or a reset button 470. The remote unit may also include one or more control pads, such as handheld control units 444*a* and 444*b*, operably attached to the base unit. The first handheld control unit 444*a* and display device 448 may correspond to a first player or team, while the second handheld control unit 444*b* and display device 450 may correspond to a second player or team. More or fewer handheld control units and/or display devices may be provided. Each of these structures may be configured in substantially the same manner as generally indicated above, and as further described below.

Each handheld control unit shown in FIG. 5 may include buttons corresponding to specific game actions. The first handheld control unit 444*a* may include: a first "buzz in" button 452 for transmitting a "buzz in" signal associated with a first player; one or more navigational buttons 456*a*-464*a*; and/or Boolean buttons 466*a* and 468*a*. The second handheld control unit 444*b* may include a second "buzz in" button 454 for transmitting a "buzz in" signal associated with a second player; one or more navigational buttons 456*b*-464*b*; and/or Boolean buttons 466*b* and 468*b*. The "buzz in" buttons may each be programmed to cause the transmitter 442 to produce a different user signal so as to enable the game to determine which player transmitted the signal. However, each navigation button and Boolean button may be programmed to cause the transmitter to produce the same user signal as its counterpart on the opposite handheld control unit.

Because remote unit 420 may include a common controller 439 and transmitter 442 for each of the handheld control units 444*a,b*, the functionality of the handheld control units may be interrelated. As discussed above, the controller 439 may be configured to selectively operate in a plurality of modes, and to change modes upon the occurrence of an event. A particular mode change, affected by the occurrence of an event (such as actuating a "buzz in" button, or other button), may affect a change in the programming of some or all of the buttons on either one or both of the handheld control units. For example, actuating a button on handheld control unit 444*a* may cause the controller 439 to change from a first mode to a second mode, whereby some or all of the buttons on control pad 444*b* are reprogrammed. Likewise, pressing reset button 470 may cause the controller to change to a base mode from a non-base mode. Mode changes may also be used to "lock out" one or more players for predetermined portions of a game, as discussed both above and below.

Figure 6:
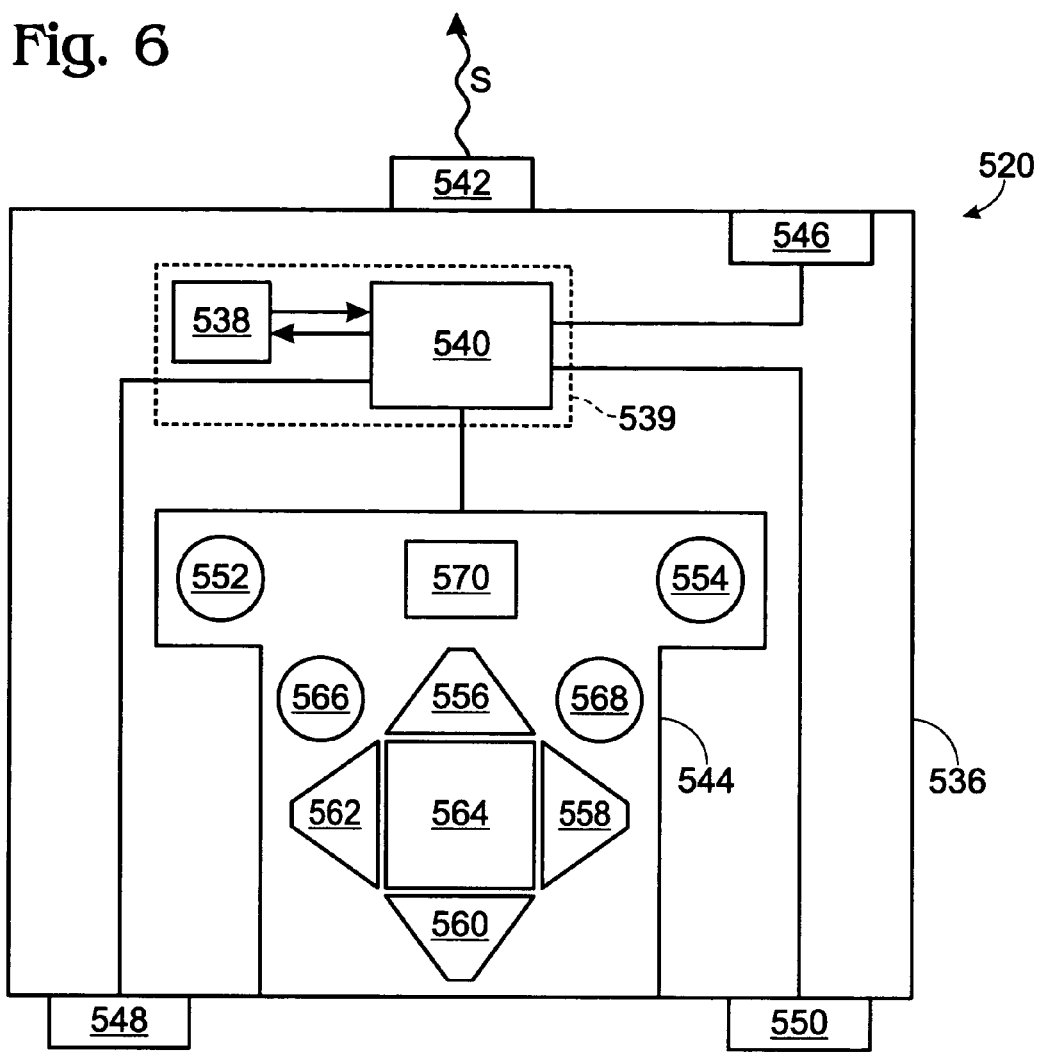
FIG. 6 shows a block diagram of yet another embodiment of the remote unit of the gaming system shown in FIG. 1

FIG. 6 shows an embodiment 520 of the remote unit 20. The remote unit 520 may include: a housing 536; a controller 539 having a memory 538 and a processor 540; a transmitter 542 for transmitting a signal S; a control pad 544; a receiver 546; and/or one or more display devices 548 and 550. Display device 548 may correspond to a first player or team, while display device 550 may correspond to a second player or team. More or fewer display devices may be provided. Each of these structures may be configured in substantially the same manner as generally indicated above, and as discussed further below.

The control pad 544 shown in FIG. 6 may include buttons corresponding to specific game actions. The control pad may include a first "buzz in" button 552 for transmitting a "buzz in" signal associated with a first player; a second "buzz in" button 554 for transmitting a "buzz in" signal associated with a second player; one or more navigational buttons 556-564; Boolean buttons 566 and 568; and/or a reset button 570. More or fewer "buzz in" buttons may be provided. The "buzz in" buttons may each be programmed to cause the transmitter 542 to produce a different user signal so as to enable the game to determine which player transmitted the signal.

Because the remote unit 520 may include a common controller 539, transmitter 542, and control pad 544, the functionality of the control pad's buttons may be interrelated. As discussed above, the controller 539 may be configured to selectively operate in a plurality of modes, and to change modes upon the occurrence of an event. A particular mode change caused by the occurrence of an event (such as actuating one of the "buzz in" buttons), may affect a change in the programming of some or all of the buttons on the control pad (such as the other "buzz in" button). Likewise, pressing the reset button 570 may cause the controller to change to a base mode from a non-base mode. Mode changes may also be used to "lock out" one or more players for predetermined portions of a game, as discussed both above and below.

3. Games

Gaming system 16 may enable one or more users to play various games. Variations may be effected: by providing different game media 18 that each store different information; by changing the information stored on a particular game medium 18; or by changing the configurations of the remote unit(s) 20. Specifically, the game information and/or remote units may each be varied as described in detail above.

Figure 7:
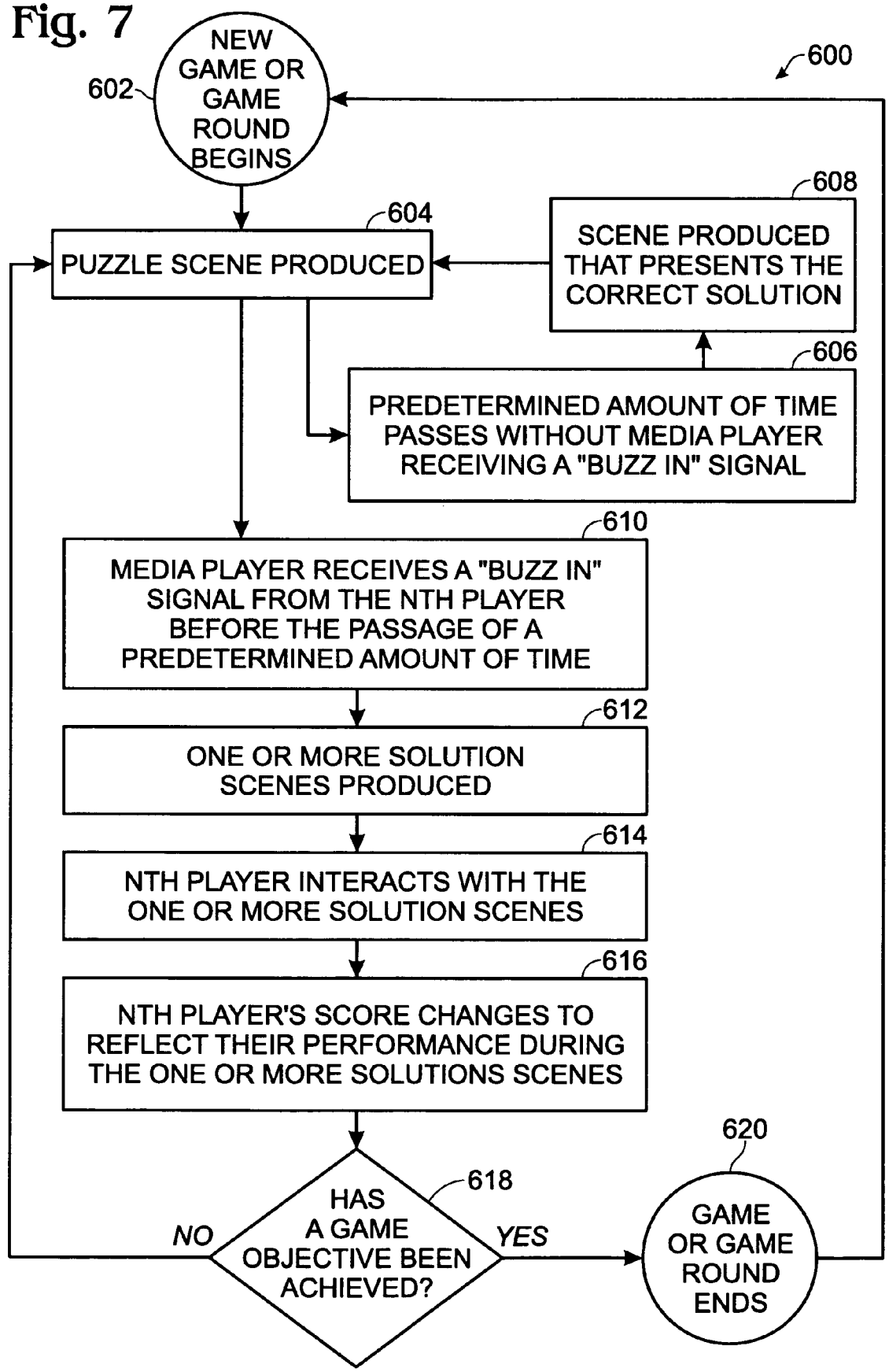
FIG. 7 shows a flow chart showing a method of playing a multiplayer game.

Multiplayer games may be played using the various embodiments of gaming system 16. As generally shown in FIG. 7, the gaming system may be used to play a game 600 with N players, where each of the players is provided with a "buzz in" button. At some point after a new game or game round has begun 602, the media player may read and execute information on the game medium, whereby the media player may produce a puzzle scene 604 that at least causes the media player to present information on one or more output devices, including a solvable puzzle. The players may be instructed to actuate their "buzz in" button if they want to attempt to solve the puzzle. Actuation of a "buzz in" button by one of the players may cause a remote unit's transmitter to transmit a user signal, corresponding to a "buzz in" signal, which is received by the media player. If a predetermined amount of time passes after presentation of the puzzle without the media player receiving a "buzz in" signal 606, then the puzzle scene may cause the media player: to first respond by producing a default scene that at least causes the media player to present the correct solution on one or more output devices; and to next produce a new puzzle scene 604, either automatically, or in response to one or more events. However, if the media player receives a "buzz in" signal from an $N^{th}$ player before the passage of a predetermined amount of time 610, then the puzzle scene may cause the media player to respond by producing one or more corresponding solution scenes 612. The $N^{th}$ player may then use user signals to interact with the one or more solution scenes 614. After interacting with the one or more solution scenes, the $N^{th}$ player's score may change to reflect their performance during the one or more solution scenes 616. Information stored on the game medium, when executed, may also cause the media player to determine whether a game objective has been achieved 618. If so, the game or game round may end 620. If not, then either the same, or a new puzzle scene may be produced by the media player 604.

The game 600 may provide the players with a gaming environment (e.g. a game show with a virtual game show host, player's turns, a scoring scheme, game rounds, and/or other game-related information) and a plurality of interactive scenes. As described above, production of each scene by the media player may cause the media player to present information on one or more output devices, including information that prompts the players to provide input via user signals. Each scene may also include one or more scripts that cause the media player to respond to the occurrence of one or more events (e.g. the reception of user signals, the passage of time, etc.) thereby causing the game to progress. Scripts may also cause the media player to record the progress of the game (e.g. the score, the current round of the game, which player's turn it is, the status of variable elements, or any other game-related information) by storing game variables in the media player's memory.

Upon using the media player to read the information stored on the game medium, a new game or game round may be begun 602. At the beginning of some games, players may be required to properly configure the gaming system. For example, the game information stored on the game medium may include one or more set-up scenes that prompt the players to enter initial game variables, such as the total number of players, the type of game, the difficulty level for each or all of the players, etc. Scripts associated with the set-up scenes may cause the media player to store these game variables in the media player's memory, whereby the values may be used to control the flow of the game. At the beginning of some games, players may also be required to properly configure the remote unit(s). For example, some games may use remote unit(s) with controllers that selectively operate in more than one mode. These remote unit(s) generally must be coordinated, or synchronized, with the scenes being produced by the media player so that the remote unit(s) is operating in the proper mode during the correct scenes. Therefore, the game may be configured to cause the occurrence of an event that sets the remote unit's controller to the correct starting mode during the correct portion of the game. For example, the media player may produce a scene that causes the media player to present information on one or more output devices that prompts the players to press a button (e.g. the reset button), which in turn resets the mode of the remote unit's controller. Alternatively or additionally, the media player may produce a scene that causes the media player to generate a signal GS with one or more output devices, which in turn resets the mode of the remote unit's controller upon reception of the generated signal GS by the remote unit's receiver.

The game 600 may include the production of a puzzle scene 604 by the media player. In order to select a particular puzzle scene for production, the game information stored on the game medium may cause the media player to randomly or deliberately select from a plurality of puzzle scenes stored on the game medium. Production of each puzzle scene may also be preceded by production of another scene that prompts one or more of the players to select a category, a difficulty level, a point value, or some other variable element that provides for variable structure to the game. The particular puzzle scene selected for production may cause the media player to present information on the one or more output devices, such as is shown in FIGS. 8 and 9.

Figure 8A:
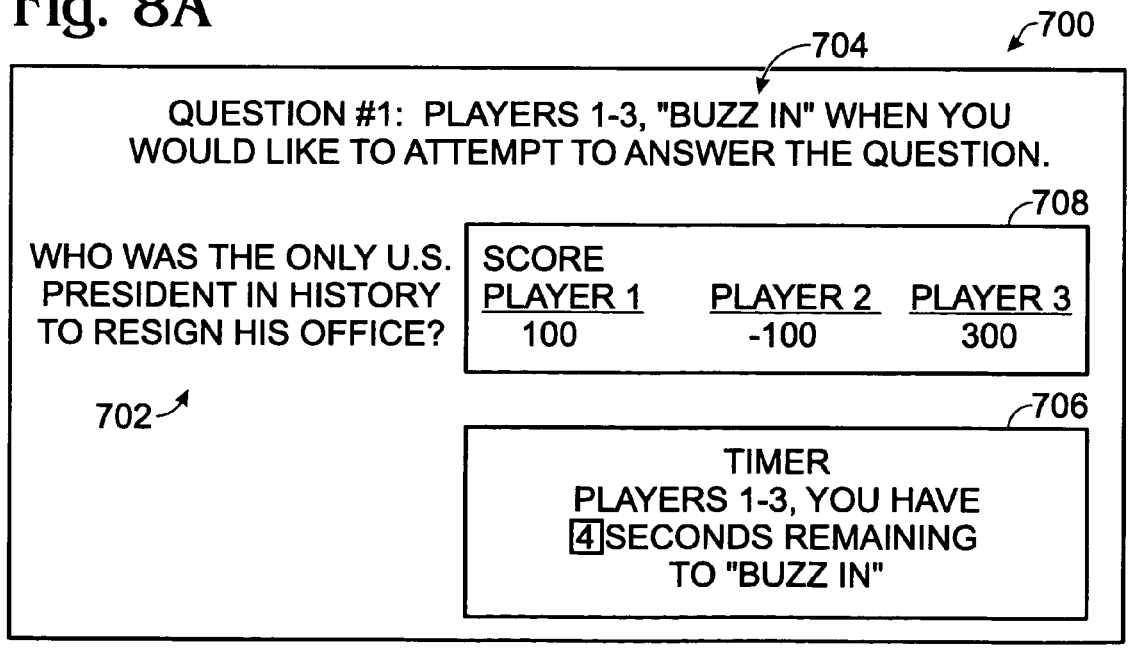
FIG. 8A shows a screen shot of presentable information associated with an embodiment of a puzzle scene.

FIG. 8 shows the presentable information 700 associated with a puzzle scene that causes the media player to provide N players with a limited amount of time to compete for a chance to solve a puzzle. As shown in FIG. 8A, the presentable information may include: a solvable puzzle 702; one or more instructions 704; a timer 706, and/or a scoreboard 708. The solvable puzzle may include a trivia question (presented in multiple-choice, complete-answer and/or true/false formats), a matching game, a spatial game, a charade, a game show question, or any other type of puzzle. The instructions may prompt the players to "buzz in" when they would like to attempt to solve the puzzle. The timer may reflect the amount of time remaining for one of the players to "buzz in." The scoreboard may include the current score for each player, as is stored in the memory of the media player.

Figure 8B:
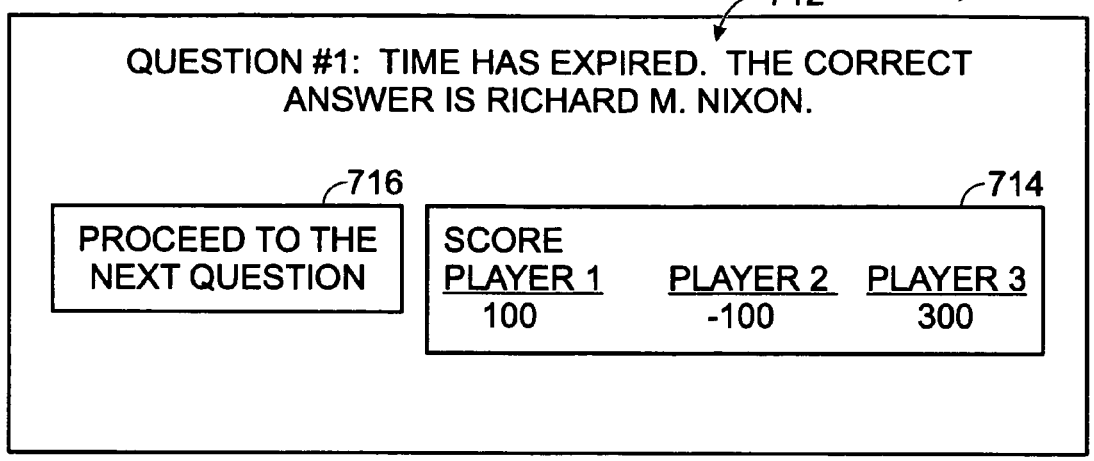
FIG. 8B shows a screen shot of presentable information associated with an embodiment of a default scene presented upon the passage of a predetermined amount of time after presentation of the information shown in FIG. 8A.
Figure 9:
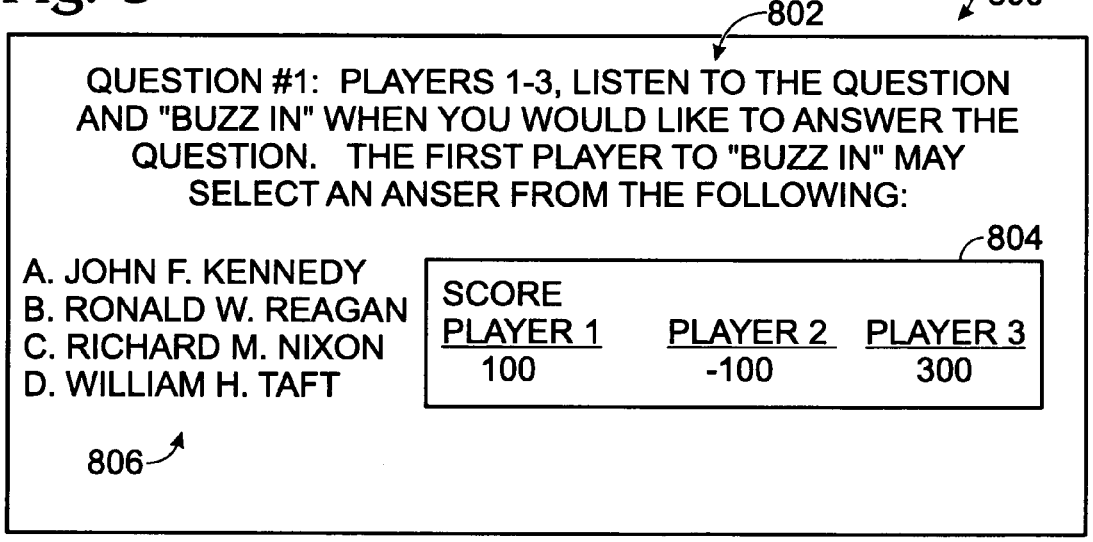
FIG. 9 shows a screen shot of presentable information associated with another embodiment of a puzzle scene.

The presentable information shown in FIG. 8A may be associated with scripts that cause the media player to respond to the first of: the passage of a predetermined amount of time, or the reception of a "buzz in" signal from one of the players. If a predetermined amount of time (as indicated by the timer 706) passes without the media player receiving a "buzz in" signal, then the puzzle scene may cause the media player to respond by producing a default scene that causes the media player to present information 710, as shown in FIG. 8B. However, if the media player receives a "buzz in" signal from an $N^{th}$ player before the passage of a predetermined amount of time, then the media player may respond by producing one or more solution scenes, as discussed below. Further, because each player's "buzz in" button may be programmed to cause the remote unit's transmitter to produce a distinct user signal (yet corresponding to the same game action), the scripts may "recognize" which player was the first to "buzz in."

The default scene produced upon the passage of a predetermined amount of time without the media player receiving a "buzz in" signal, may include presentable information 710, as shown in FIG. 8B. The presentable information may include the correct solution to the puzzle 712, and/or a scoreboard 714 showing the current score. The presentable information also may prompt the players to send one or more user signals corresponding to an indication that they are ready to interact with the next puzzle scene 716. For example, one of the players may press a reset button, an enter button, a "buzz in" button, a menu button, or any other button designated to send the appropriate signal indicating that the players are ready to proceed.

FIG. 9 shows the presentable information 800 associated with a puzzle scene that causes the media player to sequentially present a plurality of solutions/answers to N players before presenting a corresponding puzzle/question. Specifically, the presentable information 800 may include instructions 802; a scoreboard 804; and one or more solutions/ answers 806. The instructions may prompt the players to "buzz in" when they would like to attempt to solve the puzzle/question, which is not immediately disclosed upon production of the puzzle scene. The scoreboard may include the current score for each player, as is stored in the memory of the media player. The one or more solutions/answers may include at least one correct solution/answer to the as of yet undisclosed puzzle/question. Each of the solutions/answers may be displayed in the form of a readable text, a video clip, an audio clip, and/or a picture. After the solutions/answers are displayed, the puzzle scene may then cause the media player to present the corresponding puzzle, such as in the form of a "voice over," or a progressively presented text, drawing, picture, etc. At any time after the answers have been displayed, such as before, during, or after presentment of the puzzle/question, an $N^{th}$ player may transmit a "buzz in" signal indicating they would like to attempt to select the correct solution/answer.

The presentable information shown in FIG. 9 may be associated with scripts that cause the media player to respond to the reception of the "buzz in" signal by producing one or more solution scenes that enable the $N^{th}$ player to select a solution/answer. These scripts may cause the media player to immediately respond to the reception of the "buzz in" signal, whereby presentment of the puzzle/question may be interrupted. The extent to which the puzzle/question is presented therefore may depend on when the "buzz in" signal is received during production of the puzzle scene. If the "buzz in" signal is received before presentment of the puzzle/question, the puzzle scene's scripts may cause the media player to prevent any of the puzzle/question from being presented. If the "buzz in" signal is received during presentment of the puzzle/question, the puzzle scene's scripts may cause the media player to prevent the remaining unpresented portion of the puzzle/question from being presented. Therefore, the risk of "buzzing in" too early is that the puzzle scene may not have caused the media player to completely present the puzzle/question, and the nature of the complete puzzle/question may not be apparent based on the solutions/answers shown.

FIGS. 10-11 show screen shots of presentable information associated with various embodiments of the one or more solution scenes. Each of the one or more solution scenes may correspond to the preceding puzzle scene, and may be specific to the player that "buzzed in" (i.e. the $N^{th}$ player). Each of the one or more solution scenes may include presentable information, and one or more scripts that enable the $N^{th}$ player to use the remote unit to provide a solution to the puzzle. Specifically, the solution scenes may cause the media player to selectively respond to some or all of the user signals received from the $N^{th}$ player. Some solution scenes may also include scripts that cause the media player: to determine whether the $N^{th}$ player selected the correct solution; to perform calculations; to store information in the memory of the media player; to produce other scenes; and/or to generate signals GS.

Figure 10A:
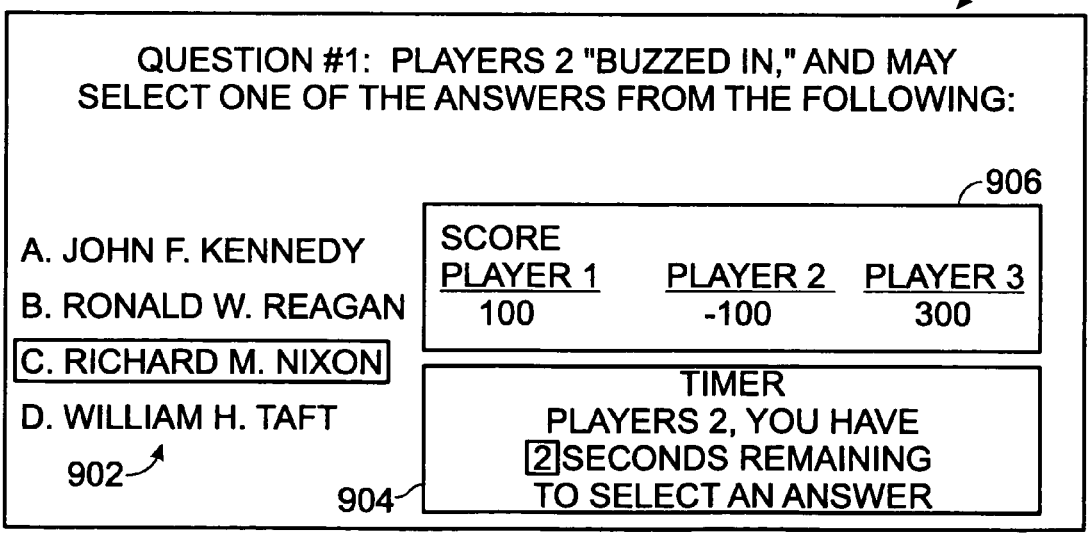
FIGS. 10A-C show screen shots of presentable information associated with an embodiment of the one or more solution scenes.

FIG. 10 shows presentable information 900, 908a and 908b associated with solution scenes that enable the $N^{th}$ player to select a solution to the puzzle with user signals. FIG. 10A shows the presentable information 900 associated with a first solution scene that, when presented on one or more output devices, directs the $N^{th}$ player to select a solution from a plurality of selectable solutions 902, at least one of which is a correct solution. The $N^{th}$ player may then transmit user signals corresponding to a selection of one of the plurality of solutions, such as by pressing directional arrow keys to highlight the desired answer, and/or an enter button to execute the selection. For puzzles having two correct answers, such as true/false questions, the first solution scene's presentable information may direct the $N^{th}$ player to directly enter a solution to a question by pressing a Boolean key (i.e. a yes/true button or a no/false button). The presentable information also may include a timer 904 that reflects the amount of time remaining for the $N^{th}$ player to select an answer, and/or a scoreboard 906 that includes the current score for each player, as is stored in the memory of the media player.

Figure 10B:
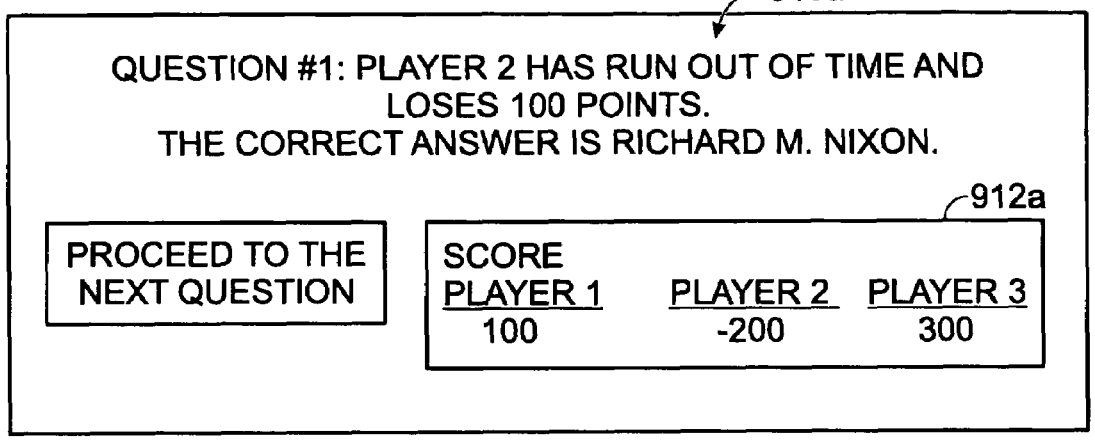
Figure 10C:
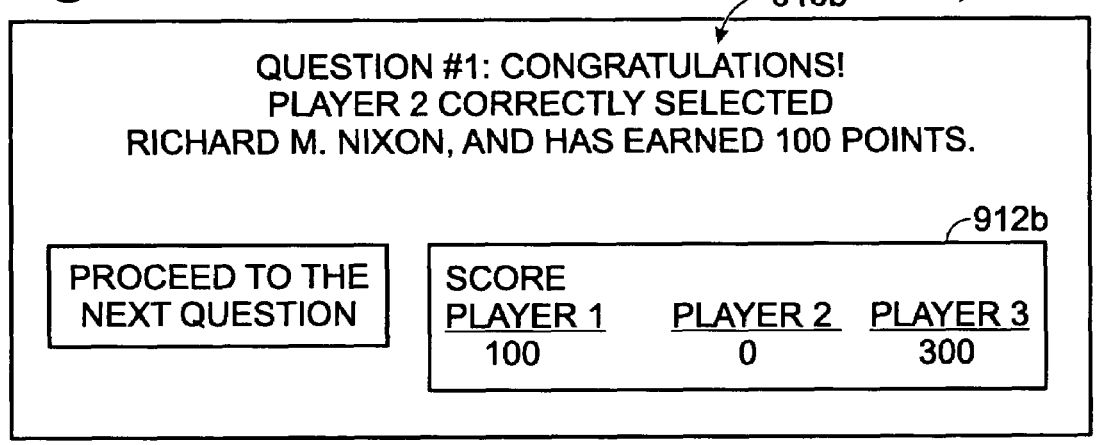

The first solution scene shown in FIG. 10A may be associated with scripts that cause the media player to respond to the first of: the passage of a predetermined amount of time; or the reception of one or more signals from the $N^{th}$ player corresponding to a selection of a solution. Specifically, if a predetermined amount of time (as indicated by the timer 904) passes without the media player receiving the $N^{th}$ player's selection, then one or more scripts associated with the first solution scene may cause the media player to respond by producing a second solution scene having presentable information 908a, as shown in FIG. 10B. However, if the media player receives a selection signal from the $N^{th}$ player before the passage of a predetermined amount of time, then one or more scripts may cause the media player to respond by producing a second solution scene having presentable information 908b, as shown in FIG. 10C. The first solution scene may also include scripts that cause the media player to determine whether the solution selected by the $N^{th}$ player is the correct solution. For example, if a solution was not selected before the passage of a predetermined amount of time, one or more scripts may cause the media player to determine that the $N^{th}$ player failed to select the correct solution. Finally, the first solution scene may include scripts that cause the media player to adjust (i.e. recalculate) the $N^{th}$ player's score based on the correctness of the answer, and the $N^{th}$ players previous score. The $N^{th}$ player's adjusted score in turn may be stored in the media player's memory.

The second solution scene(s) may cause the media player to present information, such as information 908a and 908b shown in FIGS. 10B and 10C, on one or more output devices. The information associated with the second solution scenes may provide an indication of how the $N^{th}$ player's performed during the first solution scene 910a and 910b, and/or a scoreboard 912a and 912b showing the current score. The information associated with the second solution scenes also may prompt the $N^{th}$ player, or any of the other player, to send one or more user signals indicating that the players are ready to interact with the next puzzle scene. For example, one or more of the players may press a reset button, an enter button, a "buzz in" button, a menu button, or any other button designated to send the appropriate signal indicating the players are ready to proceed.

Figure 11A:
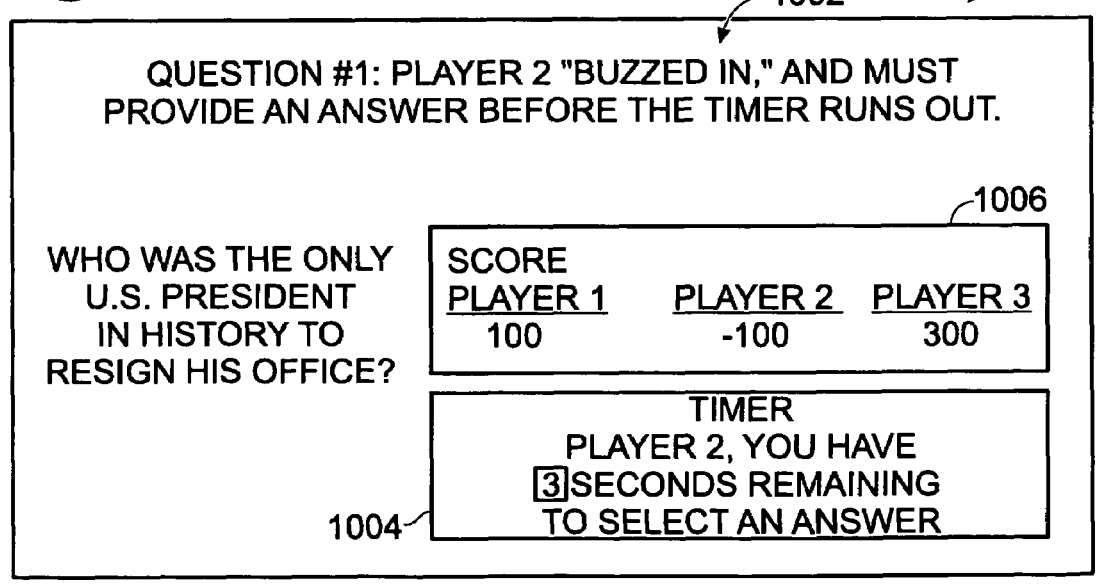
FIGS. 11A-C show screen shots of presentable information associated with another embodiment of the one or more solution scenes.

FIG. 11 shows presentable information 1000, 1008 and 1016 associated with solution scenes that enable the $N^{th}$ player to indicate whether or not they correctly wrote, spoke or otherwise expressed the solution to the puzzle. FIG. 11A shows the presentable information 1000 associated with a first solution scene that includes directions 1002 for the $N^{th}$ player to provide (i.e. write, speak, sign, charade, etc.) an answer without sending a signal to the media player. The presentable information may also include a timer 1004 that reflects the amount of time remaining for the $N^{th}$ player to provide an answer, and/or a scoreboard 1006 that includes the current score for each player, as is stored in the memory of the media player. The first solution scene may also include scripts that cause the media player to respond to the passage of a predetermined amount of time (as shown by the timer 1004) by presenting a second solution scene.

Figure 11B:
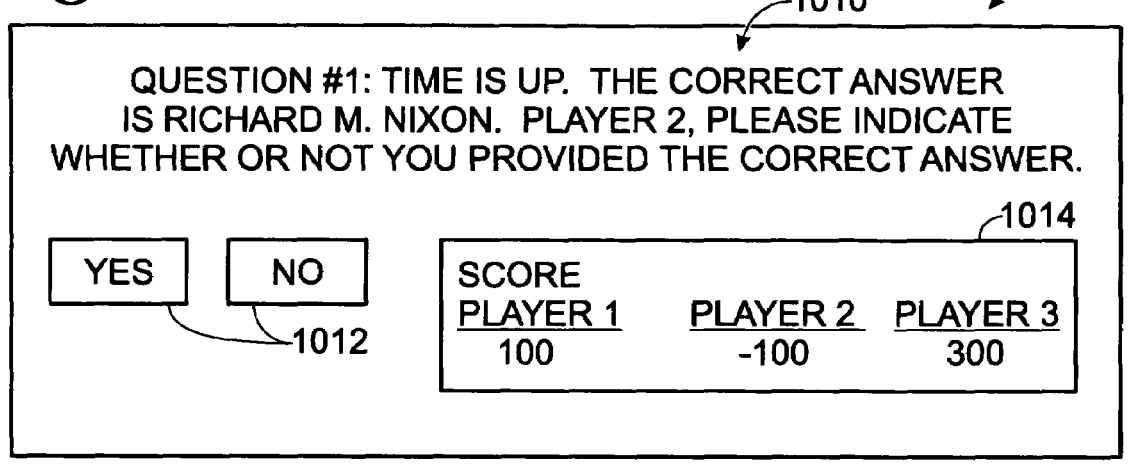

FIG. 11B shows the presentable information 1008 associated with a second solution scene. The presentable information may include an indication of the correct answer 1010, one or more selectable responses 1012 for indicating whether the $N^{th}$ player provided the correct answer, and/or a scoreboard 1014. The $N^{th}$ player may use user signals to indicate the correctness of their solution, such as by pressing directional arrow keys and an enter button, by pressing an appropriate Boolean key, etc. The second solution scene may include scripts that cause the media player to respond to the $N^{th}$ player's indication of whether they provided the correct solution by: present a third solution scene; and/or by recalculating the $N^{th}$ player's score based on their previous score. The $N^{th}$ player's recalculated score in turn may be stored in the media player's memory.

Figure 11C:
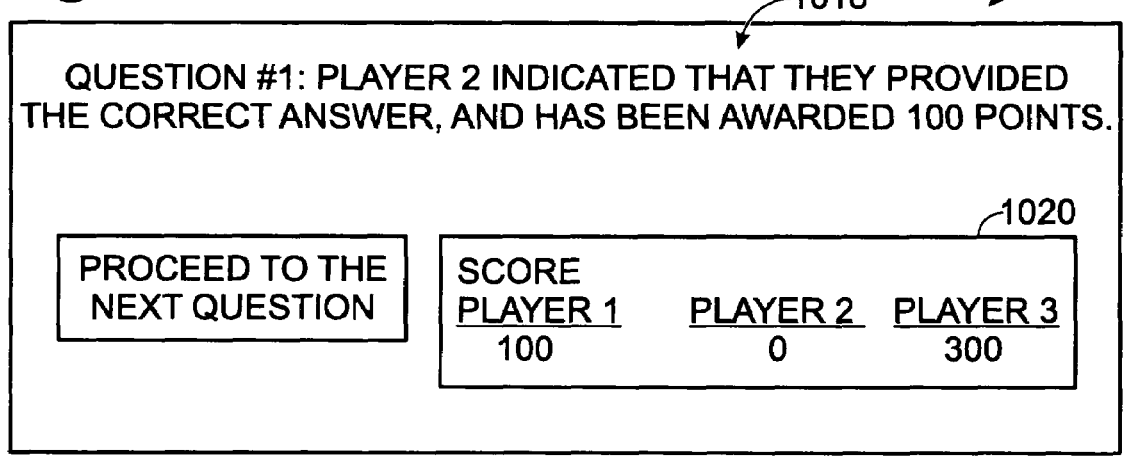

FIG. 11C shows the presentable information 1016 associated with a third solution scene. The presentable information may include an indication of the $N^{th}$ player's performance 1018, and/or a scoreboard 1020 showing the current score. The third solution scene's presentable information also may prompt the $N^{th}$ player, or any of the other player, to send one or more user signals indicating that the players are ready to interact with the next puzzle scene. For example, one or more of the players may press a reset button, an enter button, a "buzz in" button, a menu button, or any other button designated to send the appropriate signal indicating the players are ready to proceed.

Referring generally to FIG. 7, after the $N^{th}$ player interacts with the one or more solution scenes 614, and their score has changed to reflect their performance 616, one or more scripts may be read and executed by the media player that cause the media player to determine whether any game objective has been achieved 618. If so, the game or game round may end 616, and a new game or game round optionally may be begun 602. If not, then the media player may produce a new puzzle scene 604. The game objectives may be based on the amount of time the game has been played, the number of puzzles that have been presented, the score of the players, etc., as indicated by the game variables stored in the media player's memory. Further, one or more scripts may be read and executed that cause the media player to transmit generated signals GS via the output device(s). The generated signals may include information related to the progress of the game (e.g. the current score, the game round, etc.), as indicated by variables stored in the media player's memory. As described above, these generated signals may be received by the remote unit's receiver, whereby the information may be stored in the remote unit's memory, and/or displayed on the remote unit's display devices.

In some games, if a player incorrectly attempts to solve a puzzle or answer a question, the remaining players may be provided with an opportunity to "buzz in" and "steal" the puzzle or question (i.e. to correctly solve the puzzle). For example, if a first player "buzzes in" and incorrectly attempts to answer a question, a solution scene may indicate that the first player's answer was incorrect, and may re-calculate and store the first player's new score, as described above. A solution scene may also prompt one or more of the players to transmit a signal indicating that the remaining players other than the first player are ready to "buzz in" and "steal" the puzzle. The previously presented puzzle scene may then be re-presented for the benefit of all of the players other than the first player.

Some games may periodically "lock out" one or more players. As described above, some scenes, when executed, may cause the media player to disregard the reception of one or more user signals. For example, puzzle scenes may cause the media player to respond to the reception of every player's "buzz in" signal, while solution scenes may cause the media player to only respond to the reception of signals from the player that "buzzed in." Also as described above, some remote unit's controllers may be configured to change modes upon the actuation of a button, such as the "buzz in" button. For example, the remote unit's controller may be configured to selectively operate in: a first mode that causes the remote unit's transmitter to transmit "buzz in" signals associated with all of the players; and a second mode that enables the player that "buzzed in" to transmit signals, but which prevents the remaining players from transmitting signals. The gaming system may be configured to cause the remote unit to function in the first mode during the puzzle scenes, and to change to the second mode upon actuation of the first "buzz in" button to be actuated during production of the puzzle scene. The remaining players may thereby be "locked out" of game play until the occurrence of a "mode resetting" event (i.e. actuation of a button, such as a reset button, the passage of a predetermined amount of time, and/or the reception of a generated signal GS, etc.). The "mode resetting" event may occur at a time that correlates with the end of the solution scene, or the presentment of the next puzzle scene.

Some games may include interactive scenes that are sequentially presented to each player, such that each player is provided with their own turn. As game play proceeds, the occurrence of various events may cause the remote unit's controller to change modes in a manner that facilitates the sequential nature of game play. For example, players that are waiting for their turn may be "locked out," or may only be able to send limited signals until it is their turn to interact with the game.

It is believed that this disclosure encompasses multiple distinct inventions with independent utility. While each of these inventions has been described in its best mode, numerous variations are contemplated. All novel and non-obvious combinations and subcombinations of the described and/or illustrated elements, features, functions, and properties should be recognized as being included within the scope of this disclosure. Applicant reserves the right to claim one or more of the inventions in any application related to this disclosure. Where the disclosure or claims recite "a," "a first," or "another" element, or the equivalent thereof, they should be interpreted to include one or more such elements, neither requiring nor excluding two or more such elements.

I claim:

1. A gaming system for use with a media player and one or more output devices, wherein the media player is configured to receive user signals, to read and execute information from a game medium, and to present portions of the information on the one or more output devices, the gaming system comprising:
   a first remote unit operable by a first user, including:
   a first controller;
   a first transmitter coupled to the first controller; and
   one or more buttons coupled to the first controller, including a first button;
   wherein the first controller is configured to cause the first transmitter to transmit a corresponding user signal upon actuation of each of the one or more buttons, including a first user signal upon actuation of the first button;

a second remote unit operable by a second user, including:
a second controller;
a second transmitter coupled to the second controller; and
one or more buttons coupled to the second controller, including a second button;
wherein the second controller is configured to cause the second transmitter to transmit a corresponding user signal upon actuation of each of the one or more buttons, including a second user signal upon actuation of the second button; and
a game medium having information readable by the media player that, when executed, causes the media player to produce a game having a plurality of scenes, wherein each scene causes the media player:
to present information on at least one of the one or more output devices; and
to selectively respond to the reception of user signals;
wherein a first scene causes the media player to present information on at least one of the one or more output devices that includes a solvable puzzle, and either:
to respond to the reception of the first user signal by producing a second scene that prompts a user of the first remote unit to provide a solution to the puzzle in a manner that does not require sending a signal, sequentially followed by a third scene that displays a correct solution to the puzzle and prompts a user of the first remote unit to transmit one or more signals indicating whether the provided solution is the correct solution, wherein the second and third scenes each cause the media player to disregard the reception of one or more user signals transmitted by the second transmitter; or
to respond to the reception of the second user signal by producing a fourth scene that prompts a user of the second remote unit to provide a solution to the puzzle in a manner that does not require sending a signal, sequentially followed by a fifth scene that displays a correct solution to the puzzle and prompts a user of the second remote unit to send one or more signals indicating whether the provided solution is the correct solution, wherein the fourth and fifth scenes each cause the media player to disregard the reception of one or more user signals transmitted by the first transmitter.

2. The gaming system of claim 1, wherein:
the media player is a digital video disc player;
the first remote unit is a first remote control for use with the digital video disc player;
the second remote unit is a second remote control for use with the digital video disc player; and
the game medium is a digital video disc.

3. The gaming system of claim 2, wherein the first and second remote controls are universal remote controls programmable for use with a plurality of digital video disc players.

4. The gaming system of claim 1, wherein the first remote unit further includes a receiver that is coupled to the first controller, and is configured to receive one or more generated signals transmitted by at least one of the one or more output devices.

5. The gaming system of claim 4, wherein:
at least one of the one or more generated signals includes information related to the progress of the game; and
the first remote unit further includes a display device coupled to the first controller, wherein the first controller is configured to visually display the information related to the progress of the game upon reception of the generated signal by the receiver.

6. The gaming system of claim 5, wherein the information related to the progress of the game includes a score of the game.

7. The gaming system of claim 1, wherein:
the first remote unit further includes a display device coupled to the first controller, the first controller being configured to visually display information related to the progress of the game on the display device.

8. A method of playing a game having a plurality of scenes, comprising:
producing a first scene with a media player, wherein the first scene causes the media player to present a solvable puzzle to a plurality of players on one or more output devices coupled to the media player, and wherein a remote unit is associated with each of the plurality of players;
transmitting a signal from one or more of the plurality of remote units during production of the first scene;
receiving each signal transmitted during production of the first scene at the media player;
responding to a first signal, which is temporally the first signal received by the media player during production of the first scene, by producing:
a second scene that causes the media player to present, on at least one of the one or more output devices, instructions prompting a player associated with the remote unit that transmitted the first signal to provide a solution to the puzzle in a manner that does not require sending a signal; and
a third scene, subsequent to the second scene, that causes the media player to present, on at least one of the one or more output devices, a correct solution to the puzzle and instructions prompting a player associated with the remote unit that transmitted the first signal to transmit one or more signals indicating whether the provided solution is the correct solution;
during production of the second scene or the third scene, transmitting a second signal from a remote unit other than the remote unit that transmitted the first signal;
during production of the second scene or the third scene, receiving the second signal at the media player;
disregarding the reception of the second signal.

* * * * *